(12) United States Patent
Hector, Jr. et al.

(10) Patent No.: US 9,790,703 B1
(45) Date of Patent: Oct. 17, 2017

(54) METHODS OF UTILIZING COAL COMBUSTION RESIDUALS AND STRUCTURES CONSTRUCTED USING SUCH COAL COMBUSTION RESIDUALS

(71) Applicant: Go Team CCR LLC, Raleigh, NC (US)

(72) Inventors: Francis Norbert Hector, Jr., Raleigh, NC (US); Juan Keith Carroll, Littleton, NC (US)

(73) Assignee: Go Team CCR LLC, Raleigh, NC (US)

( * ) Notice: Subject to any disclaimer, the term of this patent is extended or adjusted under 35 U.S.C. 154(b) by 0 days.

(21) Appl. No.: 15/416,460

(22) Filed: Jan. 26, 2017

Related U.S. Application Data

(60) Provisional application No. 62/375,581, filed on Aug. 16, 2016.

(51) Int. Cl.
*E04B 1/00* (2006.01)
*E04H 9/04* (2006.01)
(Continued)

(52) U.S. Cl.
CPC ............. *E04H 9/04* (2013.01); *B32B 1/02* (2013.01); *B32B 13/04* (2013.01); *C04B 18/065* (2013.01); *C04B 28/02* (2013.01); *E04B 1/94* (2013.01); *E04B 1/985* (2013.01); *E04C 5/08* (2013.01); *E04H 5/02* (2013.01); *E04H 7/20* (2013.01); *E04H 9/06* (2013.01); *F24F 7/04* (2013.01); *F41J 11/00* (2013.01); *F41J 13/00* (2013.01); *H02K 7/1823* (2013.01); *B28B 19/00* (2013.01); *B28B 23/0081* (2013.01); *B28B 23/0087* (2013.01); *B32B 19/00* (2013.01); *B32B 2264/108* (2013.01); *B32B 2307/212* (2013.01); *B32B 2307/558* (2013.01);
(Continued)

(58) Field of Classification Search
CPC ..... E04C 2/14; E04C 2/00; E04C 2/06; B32B 19/00; E04B 2/02; E04B 2002/0208; E04B 2/00; B28B 19/00; B28B 23/0087; B28B 23/0081; E04H 9/10; E04H 9/04; E04H 9/00; F41H 5/0407; C04B 16/08; C04B 40/0028; C04B 16/085; C04B 16/082
USPC ... 52/742.14, 309.9, 309.12, 309.17, 745.19, 52/106, 741.3; 264/36.2, 37.33
See application file for complete search history.

(56) References Cited

U.S. PATENT DOCUMENTS

| 866,842 A | 9/1907 | Comstock |
|---|---|---|
| 1,198,172 A | 9/1916 | Wagner |

(Continued)

FOREIGN PATENT DOCUMENTS

| CA | 2123129 | 6/1993 |
|---|---|---|
| EP | 1655410 B1 | 5/2006 |
| WO | 2010036270 A1 | 4/2010 |

*Primary Examiner* — Chi Q Nguyen
(74) *Attorney, Agent, or Firm* — Shumaker, Loop & Kendrick LLP

(57) ABSTRACT

A process of fabricating a static structure including an interior volume that includes the steps of mixing coal combustible residual (CCR) with structural reinforcing materials to form a construction material and utilizing the construction material to fabricate exterior enclosure-forming components of the static structure. The enclosure-forming components are sufficiently reinforced, enhanced and/or thick to provide protection against exterior forces directed against the structure.

6 Claims, 34 Drawing Sheets

(51) Int. Cl.

| | | |
|---|---|---|
| E04H 5/02 | (2006.01) | |
| E04H 7/20 | (2006.01) | |
| E04C 5/08 | (2006.01) | |
| E04B 1/94 | (2006.01) | |
| E04B 1/98 | (2006.01) | |
| E04H 9/06 | (2006.01) | |
| F24F 7/04 | (2006.01) | |
| H02K 7/18 | (2006.01) | |
| B32B 1/02 | (2006.01) | |
| B32B 13/04 | (2006.01) | |
| C04B 18/06 | (2006.01) | |
| C04B 28/02 | (2006.01) | |
| F41J 11/00 | (2009.01) | |
| F41J 13/00 | (2009.01) | |
| E04B 1/92 | (2006.01) | |
| F24F 7/00 | (2006.01) | |
| C04B 111/20 | (2006.01) | |
| C04B 111/00 | (2006.01) | |
| E04B 2/00 | (2006.01) | |
| B32B 19/00 | (2006.01) | |
| E04C 2/00 | (2006.01) | |
| E04B 2/02 | (2006.01) | |
| B28B 19/00 | (2006.01) | |
| E04C 2/06 | (2006.01) | |
| E04C 2/14 | (2006.01) | |
| C04B 16/08 | (2006.01) | |
| B28B 23/00 | (2006.01) | |
| E04H 9/00 | (2006.01) | |
| E04H 9/10 | (2006.01) | |
| C04B 40/00 | (2006.01) | |
| F41H 5/04 | (2006.01) | |

(52) U.S. Cl.
CPC ....... *B32B 2419/00* (2013.01); *B32B 2571/02* (2013.01); *C04B 16/08* (2013.01); *C04B 16/082* (2013.01); *C04B 16/085* (2013.01); *C04B 40/0028* (2013.01); *C04B 2111/0075* (2013.01); *C04B 2111/00258* (2013.01); *C04B 2111/00293* (2013.01); *C04B 2111/00724* (2013.01); *C04B 2111/00732* (2013.01); *C04B 2111/00775* (2013.01); *C04B 2111/2046* (2013.01); *C04B 2111/2053* (2013.01); *E04B 2/00* (2013.01); *E04B 2/02* (2013.01); *E04B 2001/925* (2013.01); *E04B 2002/0208* (2013.01); *E04C 2/00* (2013.01); *E04C 2/06* (2013.01); *E04C 2/14* (2013.01); *E04H 9/00* (2013.01); *E04H 9/10* (2013.01); *F24F 2007/001* (2013.01); *F41H 5/0407* (2013.01)

(56) References Cited

U.S. PATENT DOCUMENTS

| | | | |
|---|---|---|---|
| 1,633,132 | A | 6/1927 | Schoenhoefer |
| 1,936,810 | A | 11/1933 | Upson |
| 4,414,001 | A | 11/1983 | Kunii |
| 5,013,349 | A | 5/1991 | Tanaka |
| 5,152,837 | A | 10/1992 | Rademaker |
| 5,227,100 | A | 7/1993 | Koslowski et al. |
| 5,393,794 | A | 2/1995 | Sperber |
| 5,541,249 | A | 7/1996 | Hughes et al. |
| 5,974,762 | A * | 11/1999 | Rodgers ................. B28B 19/00 52/309.12 |
| 6,054,074 | A * | 4/2000 | Wu ........................ C04B 2/066 264/117 |
| 6,084,011 | A | 7/2000 | Lucero et al. |
| 6,277,189 | B1 * | 8/2001 | Chugh ................. C04B 28/021 106/640 |
| 6,334,895 | B1 * | 1/2002 | Bland .................. C04B 18/021 106/705 |
| 6,716,293 | B2 * | 4/2004 | Taymourian .............. B32B 5/18 106/405 |
| 6,916,863 | B2 | 7/2005 | Hemmings et al. |
| 6,984,670 | B2 | 1/2006 | Meyers, III et al. |
| 7,241,818 | B2 | 7/2007 | Hemmings et al. |
| 7,297,720 | B2 | 11/2007 | Meyers, III et al. |
| 7,708,825 | B2 | 5/2010 | Sun et al. |
| 7,727,329 | B2 | 6/2010 | Gleeson et al. |
| 7,842,264 | B2 | 11/2010 | Cooper et al. |
| 7,879,144 | B2 | 2/2011 | Hemmings et al. |
| 7,888,409 | B2 | 2/2011 | Hayata et al. |
| 7,906,028 | B2 | 3/2011 | Constantz et al. |
| 8,025,457 | B2 | 9/2011 | Halahmi et al. |
| 8,044,121 | B2 | 10/2011 | Mogi et al. |
| 8,062,418 | B2 | 11/2011 | Constantz et al. |
| 8,104,233 | B2 | 1/2012 | Wilsey |
| 8,114,214 | B2 | 2/2012 | Constantz et al. |
| 8,137,455 | B1 | 3/2012 | Constantz et al. |
| 8,138,234 | B2 | 3/2012 | Brown |
| 8,138,256 | B2 | 3/2012 | Soyama et al. |
| 8,177,909 | B2 | 5/2012 | Constantz et al. |
| 8,206,504 | B2 | 6/2012 | Bethani |
| 8,222,323 | B2 | 7/2012 | Xing et al. |
| 8,299,136 | B2 | 10/2012 | Brown |
| 8,362,113 | B2 | 1/2013 | Xing et al. |
| 8,389,605 | B2 | 3/2013 | Xing et al. |
| 8,603,240 | B2 | 12/2013 | Morano et al. |
| 8,636,941 | B1 * | 1/2014 | Ciuperca ................. E01C 23/03 106/707 |
| 8,647,400 | B2 | 2/2014 | Dash et al. |
| 8,672,011 | B2 | 3/2014 | Miyazaki |
| 8,721,785 | B2 | 5/2014 | Mohamed et al. |
| 8,765,841 | B2 | 7/2014 | Brien |
| 8,765,857 | B2 | 7/2014 | Fujimaru et al. |
| 8,802,765 | B2 | 8/2014 | Yang et al. |
| 8,846,776 | B2 | 9/2014 | Herrington et al. |
| 8,857,118 | B2 | 10/2014 | Constantz et al. |
| 8,859,719 | B2 | 10/2014 | Mohamed et al. |
| 8,901,222 | B2 | 12/2014 | I et al. |
| 8,906,156 | B2 | 12/2014 | Constantz et al. |
| 8,927,646 | B2 | 1/2015 | Erdem et al. |
| 8,946,324 | B2 | 2/2015 | Hansen |
| 8,968,688 | B2 | 3/2015 | Joshi et al. |
| 8,969,464 | B2 | 3/2015 | LeBlanc |
| 8,999,014 | B2 | 4/2015 | Bai |
| 9,016,090 | B2 | 4/2015 | Hojaji et al. |
| 9,045,366 | B2 | 6/2015 | Brien |
| 9,115,024 | B2 | 8/2015 | Bescher et al. |
| 9,139,708 | B2 | 9/2015 | Brown |
| 9,162,231 | B2 | 10/2015 | Bai |
| 3,193,629 | A1 | 11/2015 | Hansen |
| 9,181,663 | B2 | 11/2015 | Brien |
| 9,315,418 | B2 | 4/2016 | Brien |
| 9,481,759 | B2 | 11/2016 | Herrington et al. |
| 9,512,288 | B2 | 12/2016 | Brown |
| 2004/0040245 | A1 * | 3/2004 | Sinclair, Sr. ........ B29C 47/0004 52/605 |
| 2011/0086933 | A1 | 4/2011 | Herrington et al. |
| 2011/0092617 | A1 | 4/2011 | Kensicher |
| 2011/0132234 | A1 | 6/2011 | Constantz et al. |
| 2012/0029145 | A1 | 2/2012 | Brown |
| 2012/0045409 | A1 | 2/2012 | Piechocki et al. |
| 2012/0055374 | A1 * | 3/2012 | Spence ................. C04B 28/021 106/707 |
| 2012/0102875 | A1 * | 5/2012 | Wilsey ..................... E04B 1/161 52/745.05 |
| 2012/0136084 | A1 | 5/2012 | Brown |
| 2012/0240503 | A1 | 9/2012 | White |
| 2013/0005858 | A1 | 1/2013 | Wada et al. |
| 2013/0023596 | A1 | 1/2013 | Brown |
| 2013/0075010 | A1 | 3/2013 | Miyazaki |
| 2013/0112409 | A1 | 5/2013 | Baleno et al. |
| 2013/0184365 | A1 | 7/2013 | Brown |
| 2013/0196165 | A1 | 8/2013 | Donovan et al. |
| 2013/0245182 | A1 | 9/2013 | Kondo |
| 2013/0292704 | A1 | 11/2013 | Imagawa |
| 2014/0080942 | A1 | 3/2014 | Brien |

(56) References Cited

U.S. PATENT DOCUMENTS

| | | |
|---|---|---|
| 2014/0121302 A1 | 5/2014 | Brien |
| 2015/0000558 A1 | 1/2015 | Ha et al. |
| 2015/0031799 A1 | 1/2015 | Constantz et al. |
| 2015/0099409 A1 | 4/2015 | Kim |
| 2015/0128831 A1 | 5/2015 | Hojaji et al. |
| 2015/0152005 A1 | 6/2015 | Leblanc et al. |
| 2015/0203678 A1 | 7/2015 | Itoh et al. |
| 2015/0267029 A1 | 9/2015 | Hill et al. |
| 2015/0274931 A1 | 10/2015 | Chen et al. |
| 2015/0307401 A1 | 10/2015 | Chen et al. |
| 2015/0315077 A1 | 11/2015 | Lee et al. |
| 2015/0353422 A1 | 12/2015 | Fernandez et al. |
| 2016/0108328 A1 | 4/2016 | Bohlig et al. |

\* cited by examiner

METHODS OF UTILIZING COAL COMBUSTION RESIDUALS AND STRUCTURES CONSTRUCTED USING SUCH COAL COMBUSTION RESIDUALS

CROSS-REFERENCE TO RELATED APPLICATIONS AND PRIORITY

This present application claims priority from and incorporates by reference the full contents of a provisional patent application filed on Aug. 16, 2016, Application No. 62/375,581.

TECHNICAL FIELD AND BACKGROUND OF THE INVENTION

This invention relates to novel uses of a material known as "coal combustion residuals" ("CCR"). CCR, otherwise referred to as "coal ash", are finely comminuted particles of material that remain after coal has been burned to provide the immense quantities of heat required to operate high-pressure steam boilers in coal-fired electric power plants operated by electric power utilities such as the Tennessee Valley Authority, Duke Energy and others. CCR accumulates in vast quantities, and storing the material requires expense and creates environmental risk. In recent years, regulatory authorities have taken an increasingly negative view of the manner in which CCR's are stored and enacted regulations that will require that CCR's be handled in a manner different from past practice.

CCR's include fly ash, bottom ash, boiler slag, flue gas desulfurized gypsum (FGD Gypsum) and other coal combustion byproducts.

The management of CCR is regulated at both the federal and the state level. The Federal CCR Rule, 80 Fed. Reg. §21302 (Apr. 17, 2015) and the Direct Final Rule (Oct. 4, 2016) regulate coal ash as a solid waste and not as a hazardous waste. They set minimum standards for disposal and/or disposition of coal ash. Other additional state and federal regulations continue to apply to coal ash disposal. The Federal CCR Rule includes detailed standards for the design and location of coal ash landfills and impoundments, groundwater monitoring, remediation, structural integrity and final closure of landfills and impoundments.

The Federal CCR Rule does not regulate practices that meet the definition of a "beneficial" use of CCR, which must meet all of the following conditions, as found in 80 Fed. Reg. at §21349:

(1) the CCR must provide a functional benefit;
(2) the CCR must substitute for the use of a virgin material, conserving natural resources that would otherwise need to be obtained through practices such as extraction;
(3) the use of CCR must meet relevant product specifications, regulatory standards or design standards when available and when such standards are not available, CCR are not used in excess quantities; and
(4) when un-encapsulated use of CCR involves placement on the land of 12,400 tons or more in non-roadway applications, the user must demonstrate and keep records and provide such documentation upon request, that environmental releases to groundwater, surface water, soil and air are comparable to or lower than those from analogous products made without CCR, or that environmental releases to groundwater, surface water, soil and air will be at or below relevant regulatory and health-based benchmarks for human and ecological receptors during use.

EPA's final CCR management rule (https://www.regulations.gov/doucment?D=EPA-HO-RCRA-2009-0640-11970), and EPA's direct final CCR management rule https://www.ea.gov/coalash/coal-ash-rule. Worldwide web links are provided for easy reference.

Any use that fails to comply with all of the criteria above will be considered "disposal" of CCR and is subject to all disposal requirements in the Federal CCR Rule.

Department of Defense ("DoD") bases located in the United States of America are exempt from local zoning and local ordinances. Any CCR used in a beneficial use application on a military base located in the United States of America will therefore meet all the federal standards for CCR, but will avoid the necessity of complying with potentially overlapping or inconsistent standards applied by various state and local entities. Due to the recently enacted Final Rule and Direct Final Rule issued by the EPA, there are hundreds of millions of tons of CCR which could be beneficially used. Accordingly, there is a need for an appropriate use of CCR that provides the advantages of a "beneficial use" while at the same time reducing the amount of CCR material that would otherwise require disposal.

In moving large quantities of bulk material, the transportation method and cost component is always an important consideration. This invention allows the beneficial use of CCR in locations that have a less expensive transportation cost than many of the disposal options. This transportation savings is created in that there are DoD bases and other civilian uses that are in close proximity of the existing CCR storage locations and which can benefit from an invention as described in this application. For example, there are more than 200 DoD bases and over 1000 coal ash storage locations in the United States. Many of these locations are in close proximity to each other, thereby reducing the transportation cost compared to disposal options and making it economically feasible to construct static structures of various types that incorporate CCRs into the structure in numerous ways.

Another advantage of this invention is that the majority of regulated landfill disposal options have daily and yearly incoming caps on how many tons of material can be received. With the recently-enacted EPA regulations regarding CCR, in most areas there is not enough available capacity at landfills to handle the volumes of CCR that require disposal in regulated landfills nearby.

SUMMARY OF THE INVENTION

Therefore, one aspect of the invention provides a beneficial use of CCR that includes removing and/or receiving CCR from investor-owned utilities, electrical co-ops, private power-energy producers, and any other sources, from dry stacks, surface impoundments, ponds and other storage areas for CCR and then, processing the CCR material, with, if necessary, any other material until the moisture content of the CCR is within an acceptable tolerance for loading the CCR onto any acceptable container, including trucks, rail cars, watercraft, barges for shipment to the United States DoD bases to be beneficially used to construct a wide range of "hardened" structures that are often necessary on military bases to, for example, store ammunition, fuel and other explosive materials, as well as storage for vehicles, aircraft and equipment that requires protection from events, such as electromagnetic pulse ("EMP") bomb blast, severe weather events and earthquakes.

This application sets forth examples of such beneficial uses, which are illustrative of numerous similar uses in which CCR can be used and which are within the scope and intent of this application. Without limitation, these other uses can include other civilian or military hardened sites such as electronic data processing centers and similar facilities for housing electronic storage equipment, commercial backup facilities to which entities can transition in the event of natural or other disasters and warehouses and archives for storing rare, valuable or otherwise irreplaceable documents, electronic data, and objects and nuclear power reactor sites, especially for hardened backup power for spent fuel rods in cooling ponds to keep the cooling process continuing if commercial electrical power is not available.

In accordance with the invention, CCR is obtained from any suitable source of supply and delivered to military bases under the jurisdiction of the United States Department of Defense (Army, Navy, Marine, Air Force and Coast Guard) and/or any other governmental agency. The CCR is then processed for use in the construction of hardened facilities which incorporate certain construction techniques that enable the cost-effective construction of a wide variety of shelters and other static structures and facilities that are resistant to concussive forces generated by proximate explosions of whatever cause, as well as protection from, for example, ballistic, electrical, earthquakes, severe weather, hurricanes, tornadoes, cyber, electromagnetic pulse, nuclear and conventional type warfare and from solar flares. The facility's CCR use will meet the beneficial use requirements as determined by the EPA CCR Rule, now or in the future. The CCR facility will include some or all of the following design features surrounded by or under the CCR, for example, Bomb Shelter(s); EMP-proof generators; Electrical transformers protected from EMP and Solar Flares; bomb-proof construction protected by a large volume of CCR; multi-fuel generators or optionally small scale nuclear reactors as used in nuclear powered submarines or ships; protected shelter entrances; multi-directional pathways; personnel fallout shelters for nuclear and conventional weapons; protected storage facilities for military equipment and aircraft; electrical grid protection; solar flare protection; cyber-attack protection; multiple areas for protection redundancy; multi-fuel supplies; protected fuel storage and supply; protected military control centers and communications; geothermal cooling for areas and power generators; protected areas for military equipment, ammunition and ordinances; protected above ground or below ground generator exhaust systems; underground electrical primary feed to electrical equipment; low heat signature facilities; fire suppression systems, stairs, elevators, building life safety design features, strengthened zones to withstand blasts from different areas of a facility; collapsible zones to absorb blasts from different areas of a facility; radiation protection, offensive military weapon portals and other infrastructure and equipment required by the Department of Defense; EMP hardened parasitic electrical load; EMP-hardened ventilation systems; EMP-hardened fuel pump systems; EMP-hardened electrical switchgear and transfers; retractable communication antennas; railway with turntables to ferry helicopters and equipment into shelters protected by CCR; heated exhaust piped underground to reduce heat signature; roller compacted walls with varying distances from entrances and varying heights to trigger the explosion of enemy low flying cruise missiles; false entrances on the exterior for confusion of enemy intelligence gathering; energy exhaust piping, both vertical and horizontal; potable water wells; potable water storage; emergency medical rooms; nuclear and biological air filters; air locks to keep explosions from drawing air from interior volume areas of a facility; EMP-protected entranceways and exits from the structure; battery back-up systems; structures with self-healing features; air storage chambers; restrooms, kitchens and hospital facilities.

Use of CCR allows for increased protection strength, increased workability and design flexibility by incorporating one or more techniques, such as, mixing different types of CCR with various properties using mix designs varying the quantities of different CCR types for increased strength and workability; mixing lime with CCR for increased strength and workability; mixing cement with CCR for increased strength and workability; mixing fluidized bed ash created from different combustion fuel supplies other than coal for increased strength and workability; mixing synthetic gypsum, limestone or dolomite with CCR for increased strength and workability; mixing commercially available polymers with CCR for workability of an EMP and solar flare protection formulation and application; mixing bio-solids (sewage sludge) with CCR to produce a synthetic soil for design flexibility; mixing other products including discarded tires for increased design flexibility; and mixing other commercially available admixtures for increased mix design attributes, such as water, reagents (https://en.wikipedia.org/wiki/Reagent); entrained gases such as air and nitrogen (https://en.wikipedia.org/wiki/Air_entrainment) and synthetic and glass reinforcement fibers.

The formulation of CCR design mixtures will be on a case-by-case basis and dependent upon the materials available. The mixture designs will vary not only in content, but also in depth of applied application at the military bases depending on the DoD's and other end users' design criteria. Water, as required for optimal results, will act as a reactive agent and, with other commercially available products, as required, will be added to produce the formulated mix design to produce the required intended end use as required by the beneficial end user's design requirements.

The CCR input material will vary in its chemical characteristics depending on what type of coal was used in the combustion process and what type of combustion unit was used.

The CCR itself represents non-combustible constituents in coal. Therefore, its characteristics are strongly influenced by the source coal itself, such as lignite, bituminous coal or subbituminous coal and the techniques used for handling and storage. Combustion processes and the operating conditions of the boiler also have an effect. Factors affecting ash chemical characteristics are very plant and coal specific.

Depending on the sulphur content of the feed coal, the pH of fresh Fly Ash and Bottom Ash generally range between 4.5 and 12 (Dellantonio and others, 2010. https://www.use-a.org/sites/default/files/012014_Management% 20of%20coal% 20combustion%20wastes_ccc231.pd.

Although other patents disclose the use of CCR for various purposes, the formulation and application are not intended for finished products for commerce or for sale on the open market that are required to meet certain ASTM and ACI standards. Rather, the formulations of CCR mix designs according to this application are for specific applications for novel static structures using large amounts of CCR in a beneficial use application.

The terms "fortified CCR" and "strengthened CCR" are used extensively throughout this application and these terms are defined to mean CCR that is mixed with one or more of the following: lime, cement, circulating fluidized bed ("CFB") ash, commercially available admixtures, Class C ash, Class F ash, synthetic gypsum, limestone, dolomite, water and other materials which contain pozzolan materials.

The term "hardened structure" includes a static structure that is typically large, complex and incorporating strong physical security, modern air defenses and other important features that make them able to survive attack by conventional weapons and/or other forces describe herein.

The method of construction using CCR, as allowed under the recently published EPA's CCR Rule for Beneficial Use, or future regulations, with the above design criteria, will protect electrical production facilities, personnel and mission critical equipment. The method of construction will include some or all of the following construction means, methods, sequencing and techniques in unison with the mass volume CCR to produce the first of its kind unique facilities. The means, methods, sequencing and techniques include the following features:

The static structure will meet the requirement of the EPA regulations, which may or may not include the encapsulation of the CCR with a sub-title D liner system. Other encapsulation systems or methods may be used to meet the beneficial use requirements of the EPA CCR rule.

Depending on the seasonally high ground water level, the generator (or other power type units) and other design-constructed areas may be located below existing ground elevations or it may be placed at or above existing ground elevations.

Prior to placement of CCR, the interior space in the hardened structure will be constructed using known construction means, methods and techniques, as well as any methods that may enhance the use of this invention. Known material including poured-in-place concrete, precast concrete, sheet piling, steel, roller compacted concrete, arched ceilings, domes, precast arches, poured in place arches, onsite fabricated arches, and domes similar in design to the Brunelleschi dome (of Florence, Italy), pipes, etc. will be used. There are provisions in this invention for the use of tunnel boring machines to be used after the placement of CCR.

Structures protected by CCR may have entranceways and corridors which are multi-directional as required to absorb electromagnetic energy prior to reaching critical, secured and protected equipment.

The CCR will be dried or wetted to achieve an acceptable moisture content to achieve the required compaction factor for the CCR.

The formulation of the CCR will be processed as outlined above and below based on the Department of Defense's, and/or other end users', design criteria.

Arches, domes and barrel-vaulted structures used to create the interior spaces inside or beneath the CCR structure may be used to transmit the above dead and live loads of the CCR structure and of warfare blast to the existing grade via fortified CCR in lieu of transmitting the forces through the wall structures. Tunnel boring machines (TBM) and reinforced concrete pipe (RCP) or ductile iron pipes may also be used in the interior volume construction as described herein.

DETAILED DESCRIPTION OF THE PREFERRED EMBODIMENT

Figure 1:
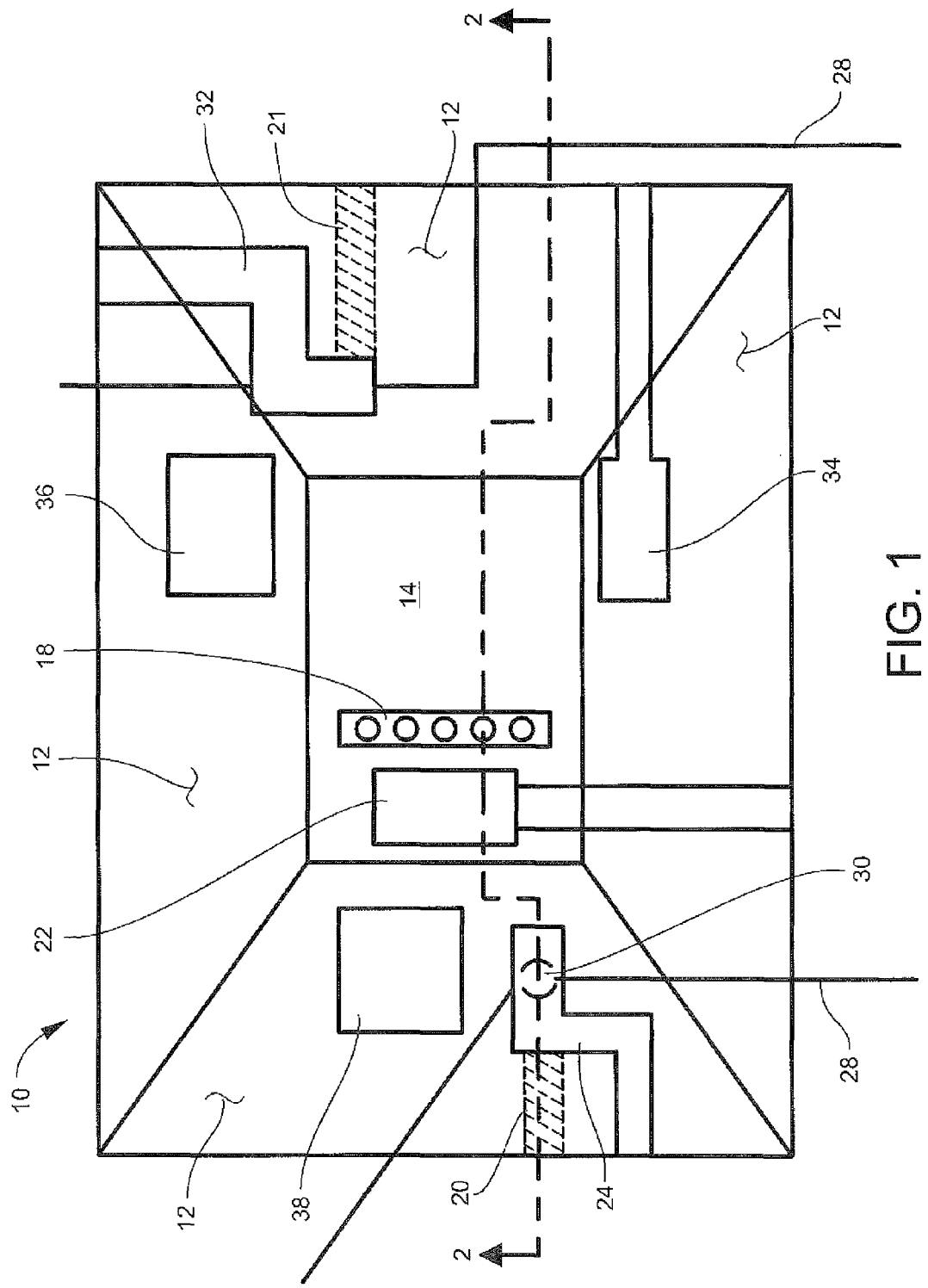
FIG. 1 is a plan view of a depicted hardened site.
Figure 2:
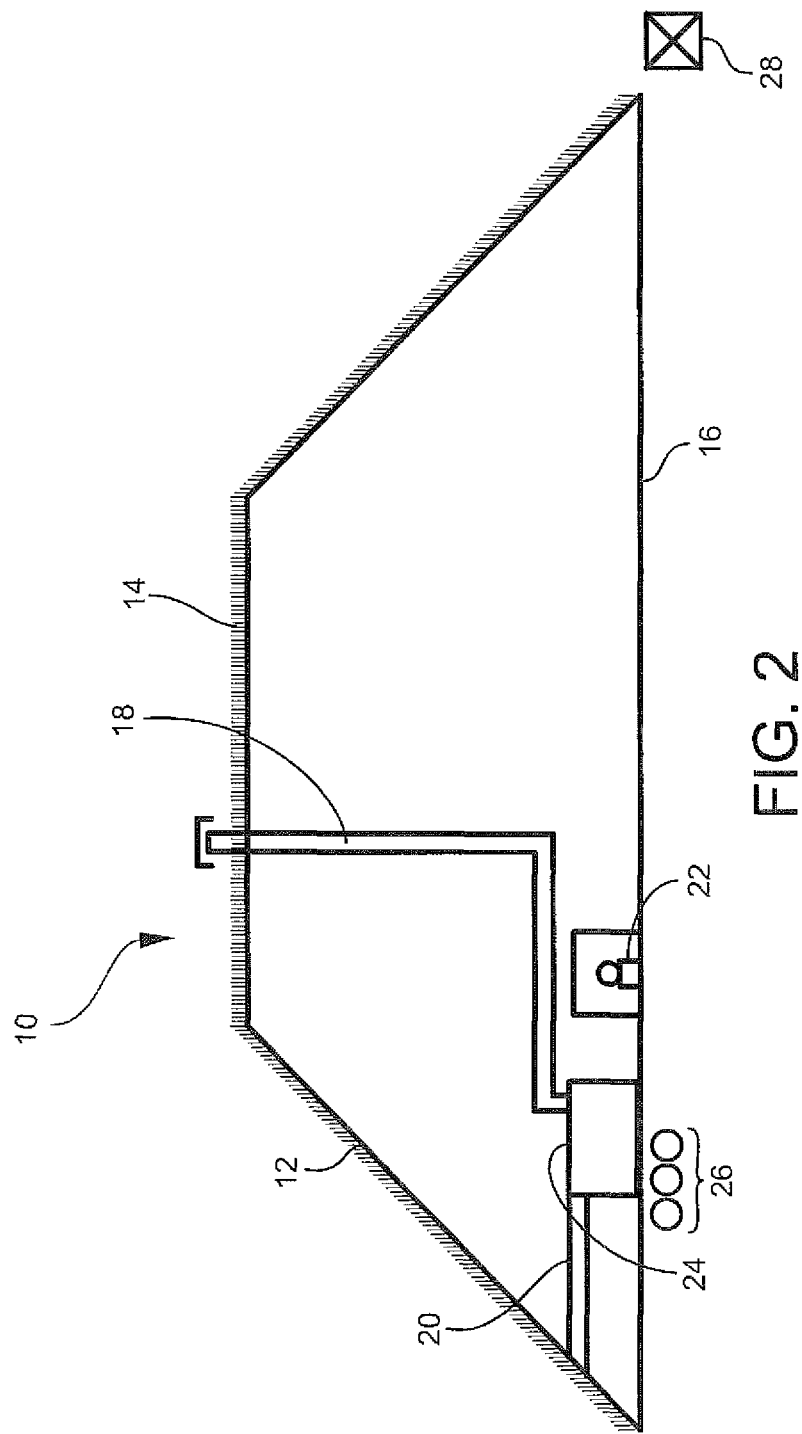
FIG. 2 is a vertical cross-section of the depicted hardened site of FIG. 1, taken generally along lines 2-2 of FIG. 1.

Referring now to the drawings, FIG. 1 and FIG. 2 illustrate one preferred embodiment of a static structure such as a bomb resistant enclosure 10 that covers 121 acres (49 hectares), uses 23 million tons (20.9 metric tons) of CCR and is approximately 170 feet (51.8 meters) high. Of course, this embodiment is only an example of a wide variety of structures that can be fabricated using the techniques disclosed in this application and is not drawn to scale. Enclosure 10 includes an interior volume enclosed by sloped sidewalls 12 and a planar top 14 that together define a truncated pyramid structure with inherent blast-deflecting characteristics. In general, the enclosure 10 is electromagnetic pulse ("EMP") resistant. The enclosure 10 is supported on compacted sub-grade material.

Primary air intake and exhaust plenums 18 maintain appropriate oxygen levels in the enclosure 10 and vent carbon dioxide, combustion gases and other air contaminants. Secondary air intake and exhaust plenums 20 and 21 can be used to replace or supplement the primary intake and exhaust plenums 18 when and if needed.

Fuel storage tanks 22 and 34 provide fuel to the enclosure 10 to operate all fuel-consuming equipment and are capable of storing and feeding multiple types of fuel as required. The enclosure 10 includes multi-fuel generators 30 and 32 for providing electric current to all electrical equipment within the enclosure 10. In addition, external electric current can be supplied by suitable conduits and transmission equipment 28 exterior to the enclosure 10. Radiator coolant storage tanks 36 and 38 store generator coolant necessary to provide coolant to the multi-fuel generators 30 and 32.

The enclosure 10 is capable of many uses for both military and civilian applications. As described further in this application, CCR has been determined to be a suitable structural material that possesses many desirable characteristics while at the same time providing a means of putting to good use CCR products that are otherwise expensive to store or dispose of. The following formulations and applications with related examples are intended to demonstrate the wide variety of beneficial uses of CCR, which are covered in this invention.

Figure 3:
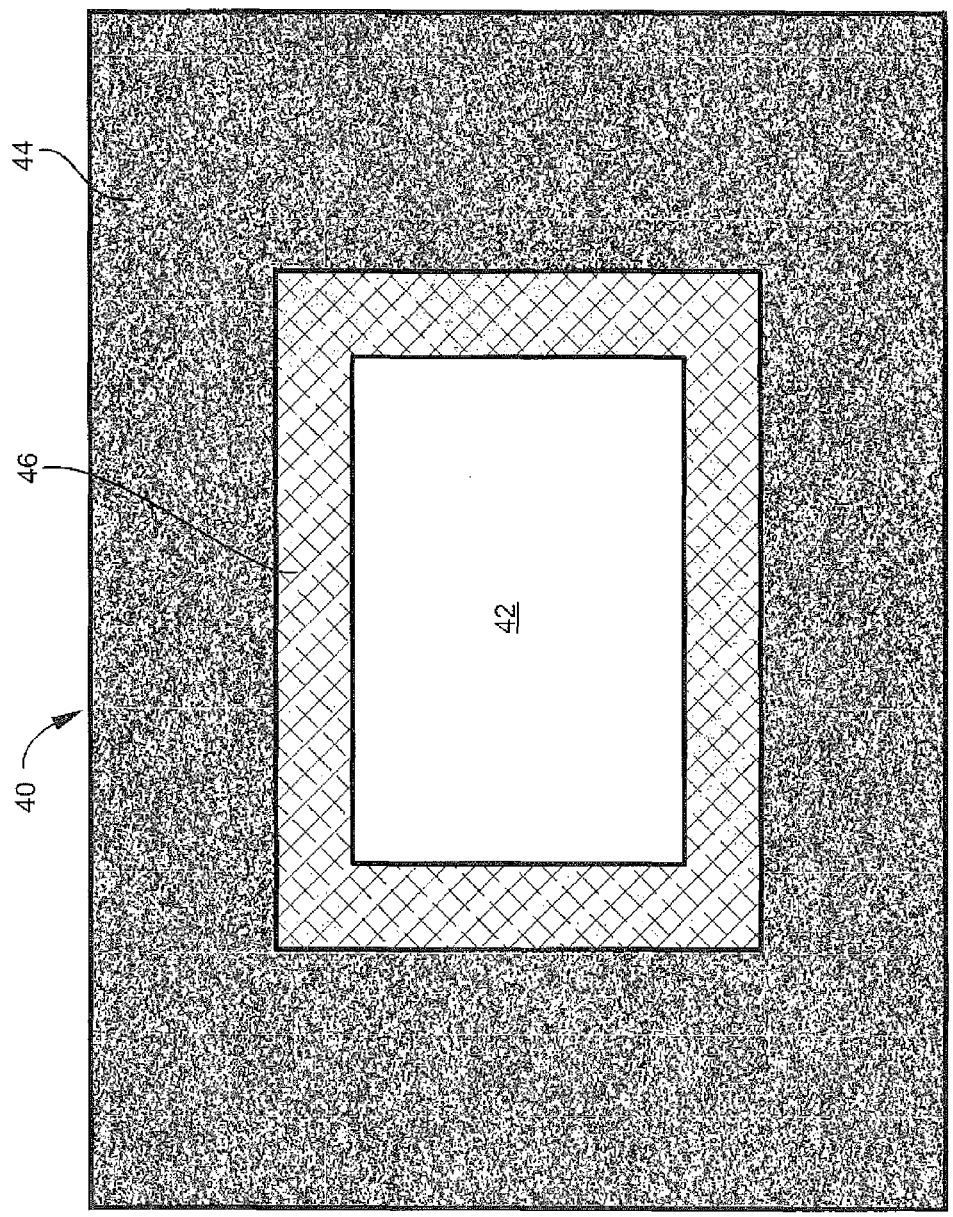
FIG. 3 is a plan view of a hardened structure that includes an absorption zone.
Figure 4:
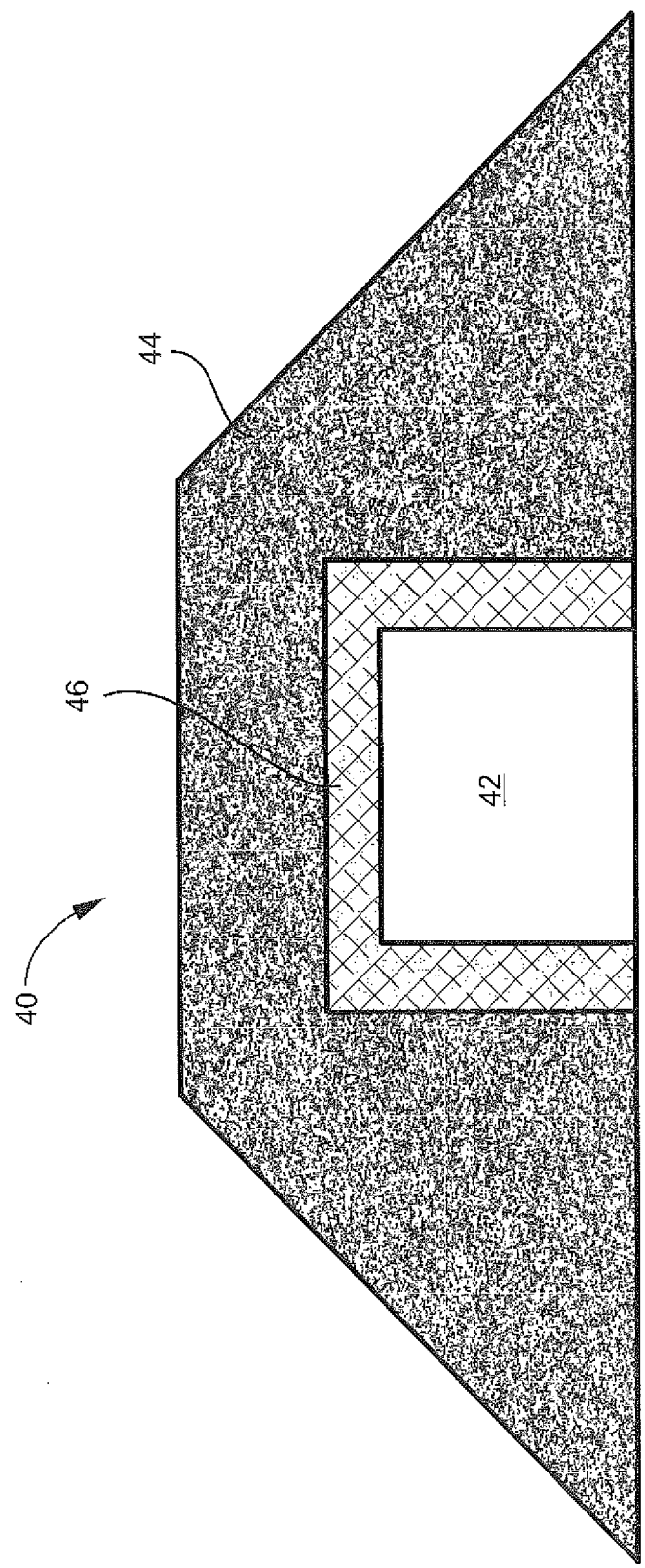
FIG. 4 is a cross-section of the hardened structure of FIG. 3.

Formulation and Application No. 1—Aggregate Formulation and Absorption Zones FIGS. 3 and 4 show a plan view and a cross section of a hardened enclosure 40 that defines an interior volume 42 that includes an absorption zone 46. The absorption zone 46 is composed of CCR that has been pelletized, agglomerated, briquetted, or field mixed and then ripped with mechanical equipment and formed into the absorption zone 46. The purpose of the absorption zone 46 is to dissipate destructive energy from exterior explosions and bombs before their destructive forces reach the interior volume space 42, which is interior to and protected by the impact zone 44, and/or the fortified part of the CCR structure. Any of the palletization, agglomerated, briquetting or field mixed and then ripped methods can be used to formulate a CCR aggregate that can be used as the absorption zone 46. FIG. 3 shows a rectangular absorption zone 46, but the impact zone 44 can vary in volume and can be of many different shapes, including circular or V-shaped in design. The thickness and degree of compaction can also be varied to accommodate loading requirements and to maximize protection for exposed areas of the enclosure 40.

FIG. 4 is a cross-section of the hardened enclosure 40 of FIG. 3. The cross-section depicts CCR that has been pelletized and applied as the absorption zone 46 to the hardened enclosure 40. After taking into account the chemical characteristics of the input CCR material, which will vary for each specific site, the CCR formulated mix design for the aggregate will be determined. Not only will the mix design take into account the input CCR chemical characteristics, but also the different methods used to produce the CCR aggregate as described below and the final design criteria of the beneficial end user. The end user may specify an aggregate that has a minimal strength and abrasion resistance so that the material can maintain its structural integrity for use in a static structure, but will collapse, as designed, upon being hit by external forces. The size of the CCR aggregate can be manufactured to different sizes as specified.

Processing of the formulation can be carried out by disk pelletizer, pug mill or an Ampel pelletizer of the type manufactured by Mars Minerals; preferably the Ampel pelletizer due to higher rate of production. See http://marsmineral.com/ampel-pelletizer.php https://www.bing.com/videos/search?q=mars+minerals+pelletizing+disc&&view=detail&mid=39539C31969B828A047839539C31969B828-A0478&rvsmid=6CC31318182E6D20A98B6CC31318182-E6D20A98B&fsscr=0&FORM=VDQVAP and https://www.google.com/patents/US3802822?dq=Mars+minerals&hl=en&sa=X&ved=0ahUKEwiv1I_X_pPPAhXI6iYKHUK8B3oQ6AEIHjAA.

The process of manufacturing pelletized CCR will be performed onsite unless space is a limiting factor. An example of the equipment and process to be used is a Mars Minerals Ampel pelletizer that can produce up to 50 tons of material per hour. A binder agent will be mixed with CCR, water and other commercially available products. The Mars Minerals Ampel will horizontally blend the formulated CCR mix design ingredients into a consistent mixture to assure the specified qualities. Upon exiting the Mars Minerals Ampel, the pelletized CCR aggregates will be moved via conveyors and radial stackers into piles to allow for the completion of the chemical process of the aggregate until the specified strength of the aggregate is achieved. Quality control of the mixing of the CCR formulated mix design will be achieved using hoppers and other equipment that accurately measure weight and dispense the required quantities of each ingredients of the mix design.

In lieu of using the Mars Minerals Ampel, if acreage is available on the beneficial end use site, CCR may be mixed and spread out in lifts or depths of varying thickness and then "ripped" with teeth pulled by bulldozers.

All of the techniques mentioned above can control the size of the produced aggregate by a secondary processing step of field screening and/or using rock crushing equipment to meet the end users' design specifications.

The strength, workability and application of the CCR pelletized aggregates will be in accordance with US DoD or other end users' design criteria, but it can be applied vertically and/or horizontally as shown in FIG. 4 or it can be used with other materials for increased absorption capabilities as described below.

Figure 5:
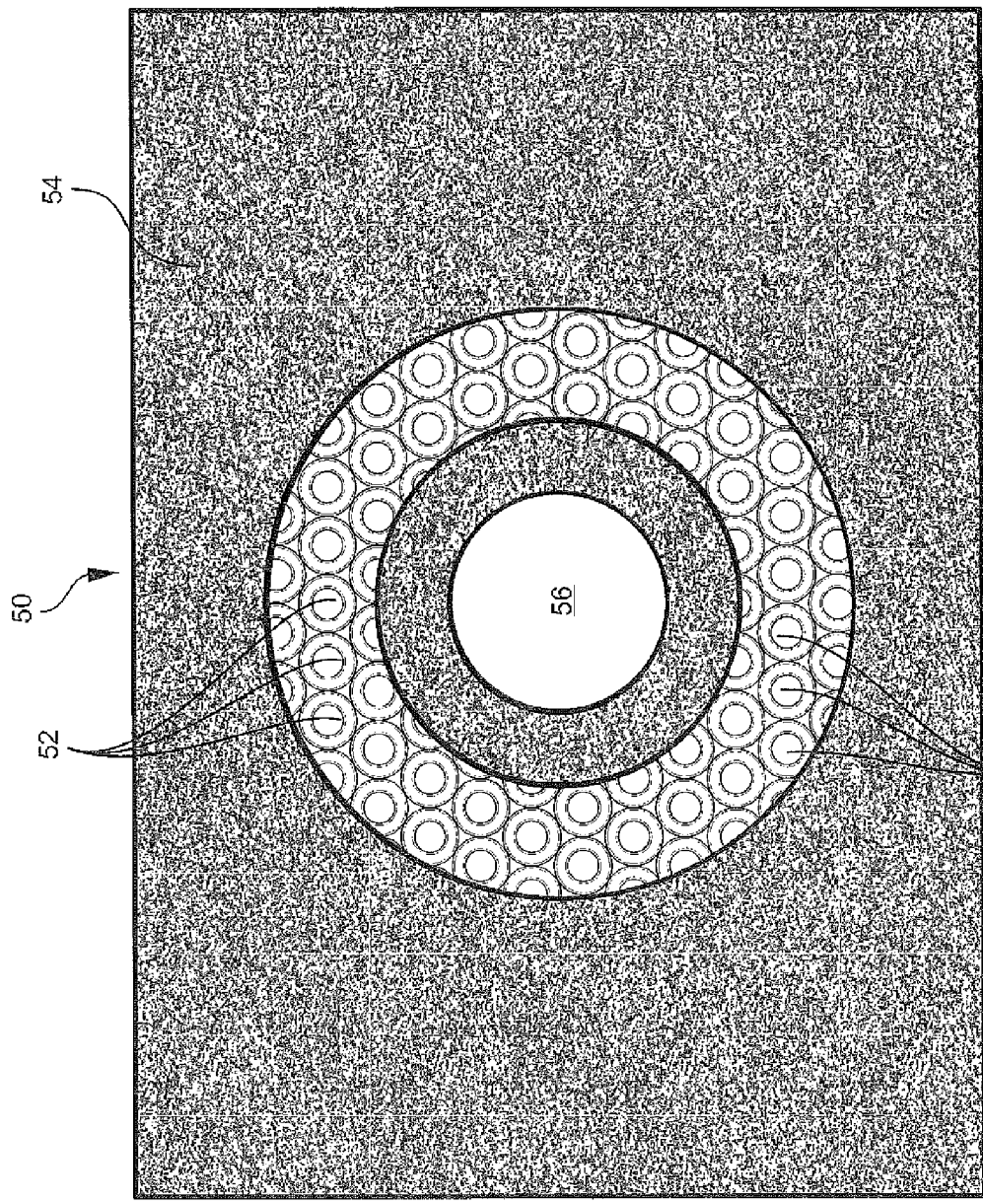
FIG. 5 is a plan view of a hardened structure that includes an absorption zone constructed out of both tires and CCR aggregate.

FIG. 5 shows a plan view of an enclosure 50 using absorption zone formed of tires 52, and either loosely compacted CCR or formulated CCR aggregates used in conjunction with each other to form an enhanced impact zone 54 defining an interior volume 56. The tires 52 are preferably used automobile and truck tires which, because of their inherent characteristics, are both highly energy absorbent, have a high strength to weight ratio and are resilient in both axial and radial directions. The absorption zone 52 can be used for horizontal skid sections (as further described below) or vertical absorption zones and can be placed both horizontally and vertically in the enclosure 50. The tires forming the absorption zone 52 can be sheared in half with commercially available shearing machinery, shredded or can be used as manufactured in an array substantially as shown in FIG. 5.

Figure 6:
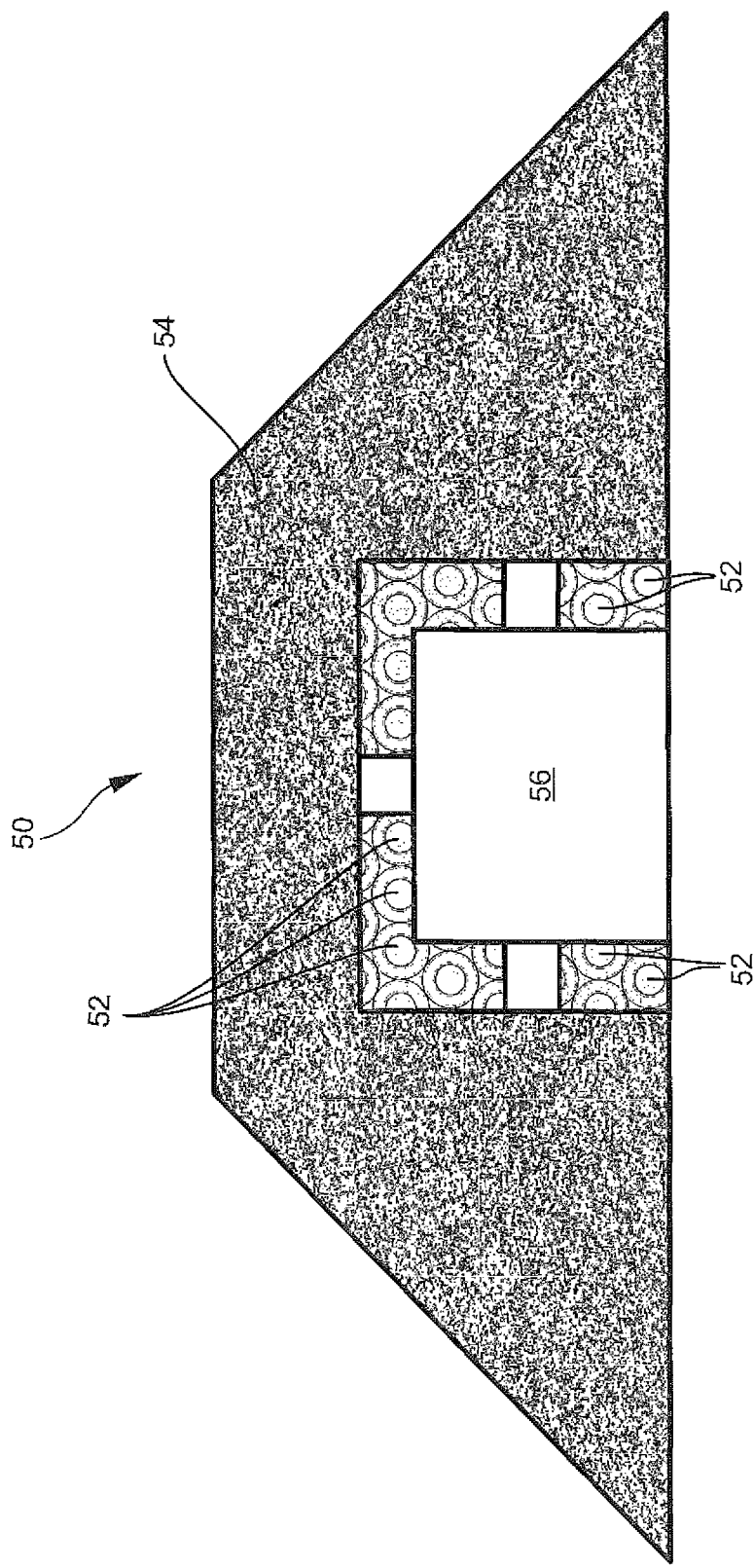
FIG. 6 is a section view of a hardened structure that includes an absorption zone constructed out of both tires and CCR aggregate.

FIG. 6 is a cross-section of FIG. 5 and further illustrates the use of CCR as an absorption zone 52 and tires 52 being used for a horizontal skid section that will allow the energy from an explosion to shift the tires 52 and CCR 54 in lieu of increased damage to the fortified enclosure 50. In FIGS. 5 and 6, class F ash or bottom ash will be the preferred material to be used since it has less binding strength than class C ash. The depth and shape of the absorption zone 52 can vary in width, depth, thickness and shape. The tires 52 can be dipped and submersed in a bath of low carbon CCR, synthetic gypsum and polymers to create a greater resistance to fire and the absorption zone created with tires 52 can have defined firebreak zones constructed of compacted CCR, both horizontally and vertically. Optionally, the tires 52 when lying in a horizontal position, can be filled will loosely compacted CCR.

Formulation and Application No. 2—Fortified and Strengthened Sections

Figure 7:
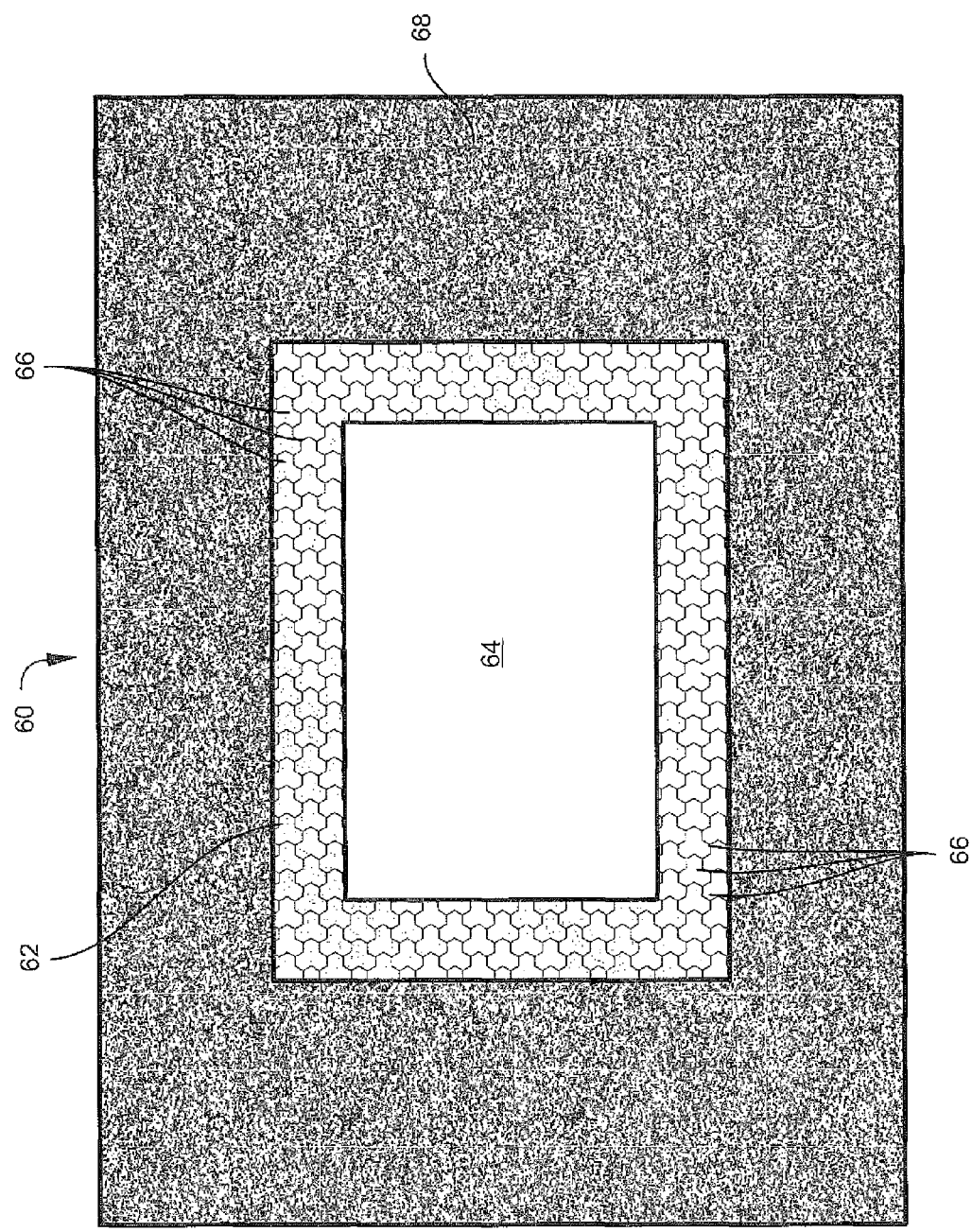
FIG. 7 shows a plan view of a hardened structure that includes fortified and strengthened zones.

Referring now to FIG. 7, an enclosure 60 defines an interior volume 64 with fortified and strengthened structures 66 surrounded by an overlying layer of CCR forming an energy impact zone 68. These structures 66 can be rectangular, circular, v-shaped, and/or other-shaped. The size, width and depth of these structures along with the shape can vary depending on the beneficial end users' design requirements.

Figure 8:
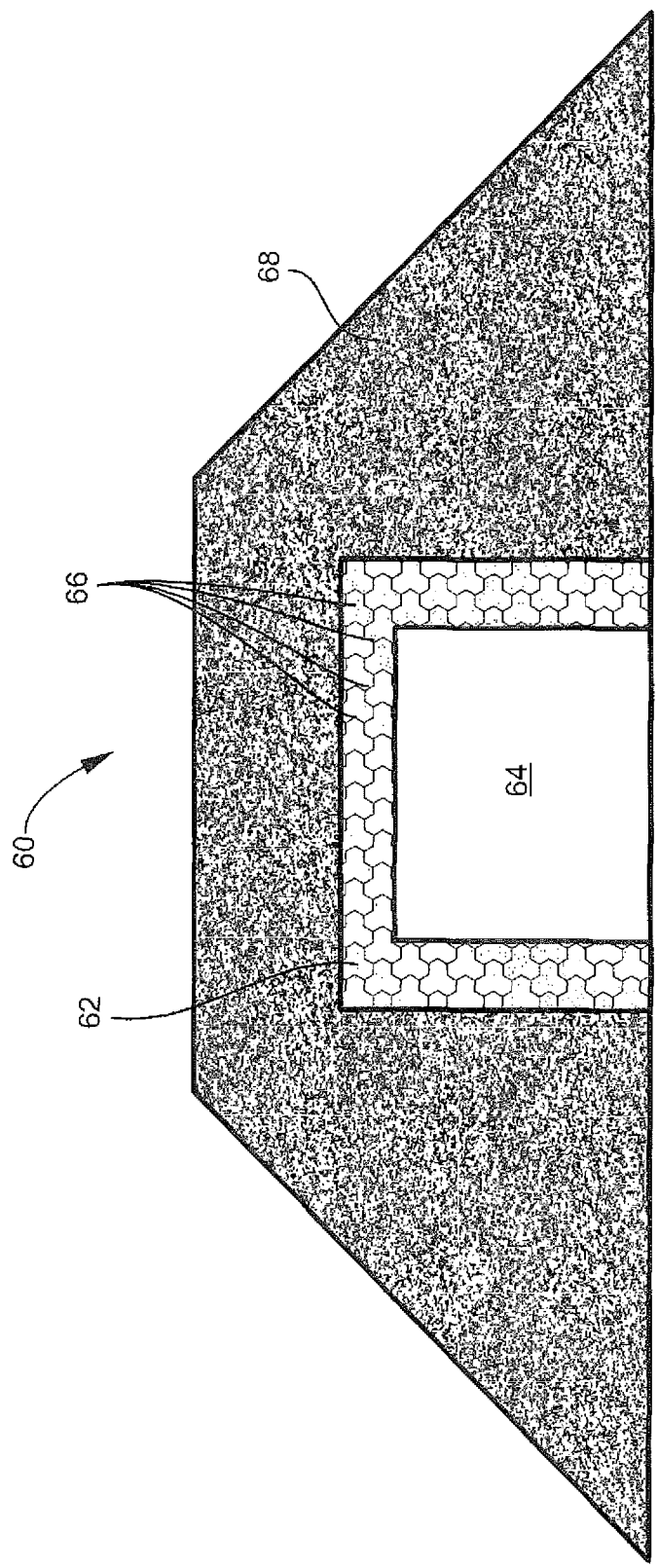
FIG. 8 shows a cross-section of a hardened structure that includes fortified and strengthened zones.

FIG. 8 is a cross-section of the enclosure 60 with the fortified and strengthened structures 66 forming the enclosure 60.

Figure 9:
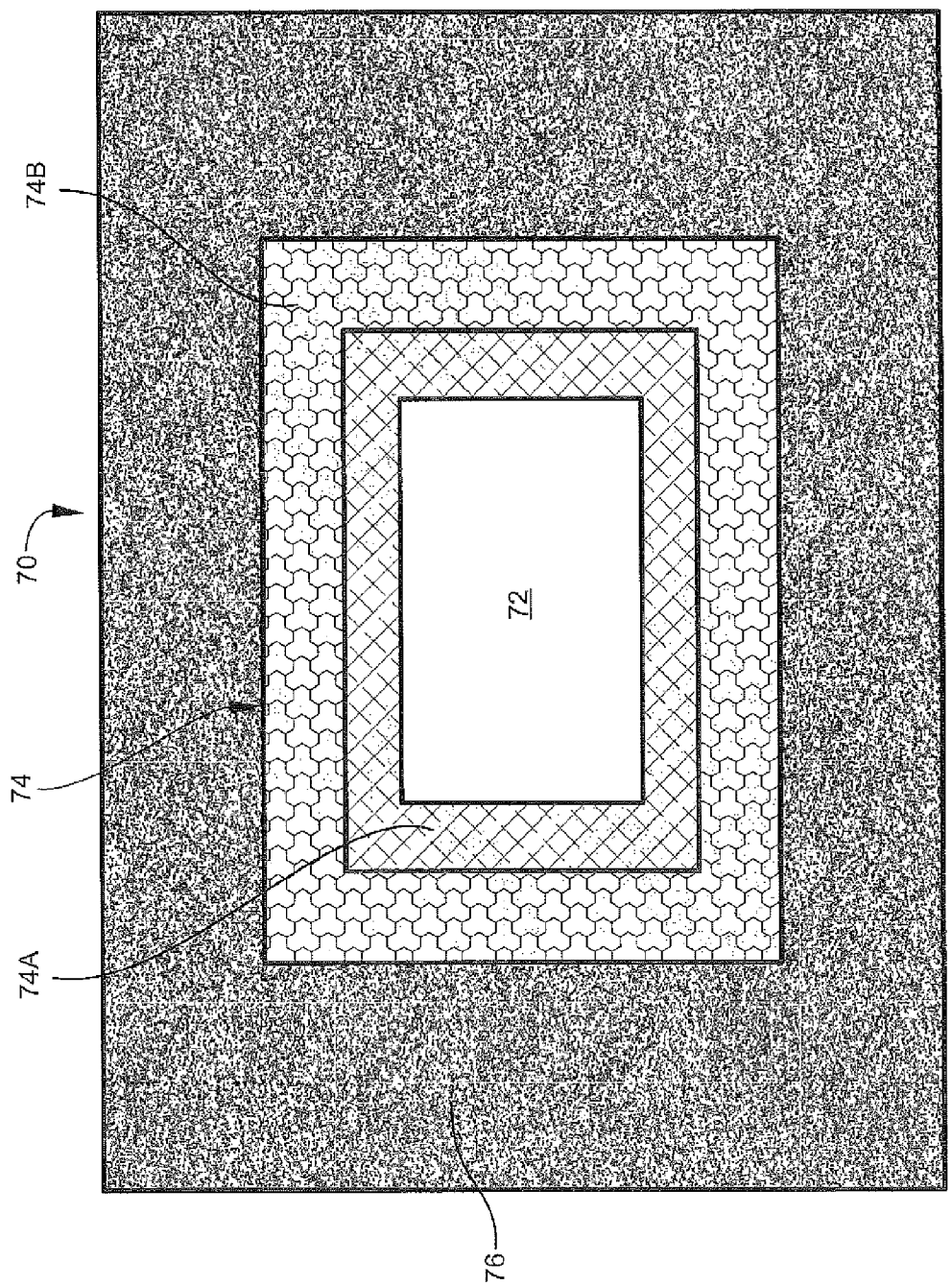
FIG. 9 shows a plan view of a hardened structure that includes both absorption zones and fortified/strengthened zones.
Figure 10:
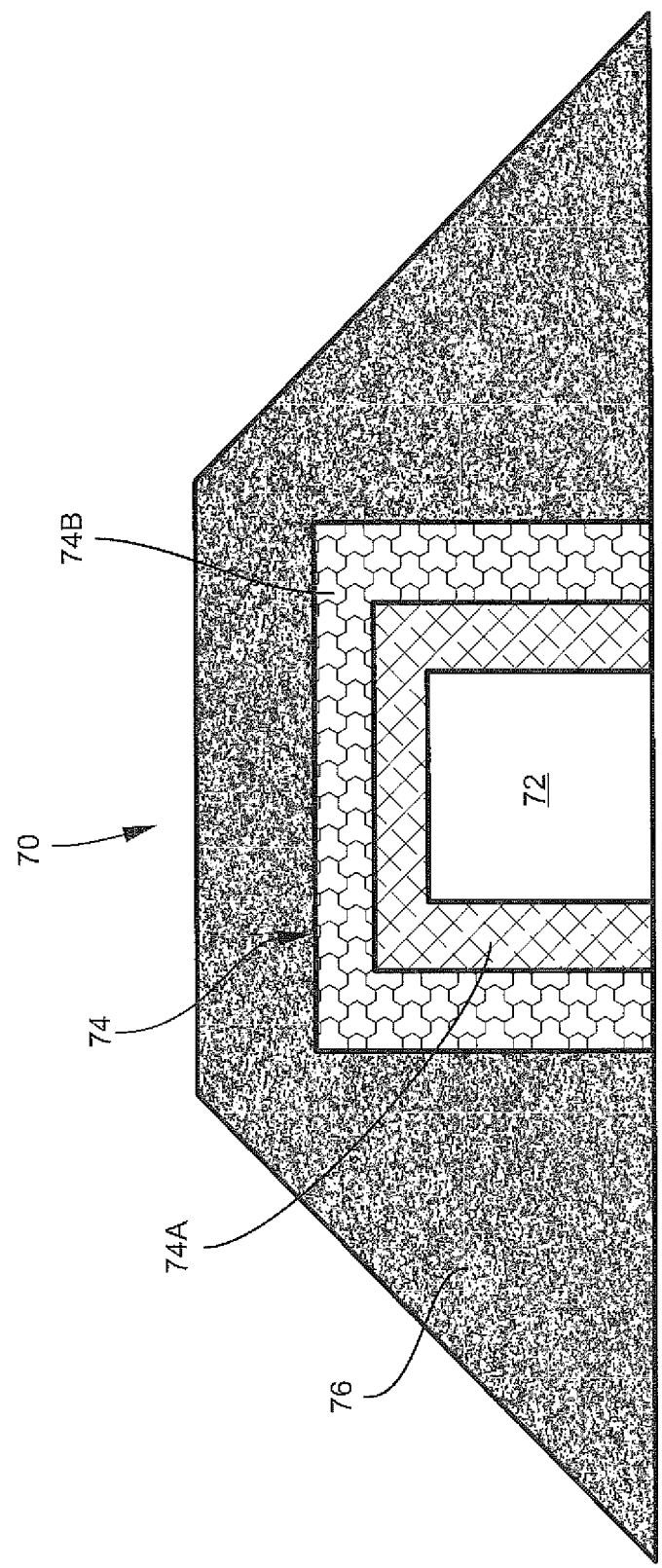
FIG. 10 shows a cross-section of a hardened structure that includes both absorption zones and fortified/strengthened zones.

FIGS. 9 and 10 are views of a hardened structure 70 that defines an interior volume 72 around which is formed a static structure 74 that includes both an absorption layer 74A and a fortified layer 74B surrounded by an overlying layer of CCR forming an energy impact zone 76.

FIG. 10 shows a cross-section of a static structure that uses absorption and fortified zones in unison. The strengthened CCR material will be applied to the static structures in specific formulations, specific areas and specific mix design formulation features to give the maximum and/or the specified amount of protection from external forces.

The material that will be used for the fortified and strengthened areas is preferably CCR mixed with cement and commercially available admixtures (Grace, Sika and others) to create roller compacted concrete https://en.wikipedia.org/wiki/Roller-compacted_concrete.

Selection of proper materials and correct proportioning is critical to the production of quality roller compacted concrete mixtures. The mixture design process should not use a trial and error approach, but rather a scientific and systematic approach that takes into account the desired engineering properties, construction requirements and economics. Suitable material is CCR that is mixed with or uses Class C ash in lieu of Class F ash. The increased lime content in Class C fly ash increases the strength and binding ability of the CCR Yet another suitable material is CCR mixed with lime (Quick, Hydrated, or Agricultural) for increased strength and workability.

Yet another suitable material is CCR mixed with cement via a disc or road reclaimers https://www.youtube.com/watch?v=qJuX5jY3mm4.

Yet another suitable material is CCR mixed with other ash products but specifically ash from circulating fluidized bed combustion (CFB) which uses coke as the source of fuel for the combustion. These products contain a high amount of calcium oxide (CaO), and calcium sulfate (CaSO4).

Yet another suitable material is CCR mixed with other commercially available admixture products that are known to strengthen and/or increase workability and durability of CCR. https://gcpat.com/construction/en-us/concrete-technology http://usa.sika.com/en/concrete-products/concrete_home.html.

Other suitable materials include mixtures with CCR, which contain pozzolan materials; https://en.wikipedia.org/wiki/Pozzolan. "Pozzolans" are a broad class of siliceous or siliceous and aluminous materials which, in themselves, possess little or no cementitious value but which will, in finely divided form and in the presence of water, react chemically with calcium hydroxide to form compounds possessing cementitious properties. The quantification of the capacity of a pozzolan to react with calcium hydroxide and water is given by measuring its pozzolanic activity. Pozzolana are naturally occurring pozzolans of volcanic origin. Pozzolana, also known as pozzolanic ash (pulvis puteolanus in Latin), is a siliceous or siliceous and aluminous material which reacts with calcium hydroxide in the presence of water at room temperature. In this reaction, insoluble calcium silicate hydrate and calcium aluminate hydrate compounds are formed possessing cementitious properties. The definition of pozzolana encompasses any volcanic material (pumice or volcanic ash), predominantly composed of fine volcanic glass, that is used as a pozzolan. Note the difference with the term pozzolan, which does not refer to the specific origin of the material, as opposed to pozzolana, which can only be used for pozzolans of volcanic origin, primarily composed of volcanic glass.

The CCR formulated mix design for the fortified and strengthened zones will be formulated after taking into account the chemical characteristics of the input CCR material (which will vary for each specific site), the different methods used to produce the fortified sections, and the final design criteria of the beneficial end user.

Formulation and Application No. 3—High Angle of Repose Wall

Certain uses of formulated CCR mix designs can be used in beneficial use applications that will require the static structure to have a slope steeper than the materials' natural angle of repose. In addition to an increased higher angle of repose, the structure will have a slenderness ratio (https://en.wikipedia.org/wiki/Slenderness_ratio) that when the formulated CCR mix design is applied to the static structure with a nearly zero angle of repose, it will be required to be applied in a method to increase the structural integrity of this specific feature of the static structure. Three examples of this type of beneficial use are: (1) a high-angle rifle training facility (HART), (2) a vertical protection wall around a protected area and (3) a static structure similar to the concept being developed under the Engineered Living Materials (ELM) program that is presently being studied by the United States Defense Advanced Research Projects Agency (DARPA).

CCR is obtained from any suitable source of supply and delivered to military bases under the jurisdiction of the United States Department of Defense (Army, Navy, Marine, Air Force, National Guard and Coast Guard) or other acceptable beneficial end use sites. The CCR is placed and compacted to structures, which will form a HART facility in view of these considerations:

1) the clear majority of CCR that is produced in the United States of America is produced in the eastern half of the country;

2) the few HART facilities located in the United States are located in the western states (west of the Mississippi River) due to the openness and the geographical terrain with mountains as provided in nature and not constructed from processed materials;

3) the vast majority of the population of the United States is located east of the Mississippi;

4) the Armed Forces of the United States have in the recent past engaged in warfare that has extensively used long-range sniper weapons;

5) the weapons, ammunition and optics are all greatly improved (and are continuing to improve) over the past decades;

6) the availability of 100s of millions of tons of CCR available to construct a HART facility on the eastern seaboard, which will save time and expense to train military personnel or civilian personnel;

7) modern sniper rifles with modern ammunition have bullets from the ammunition, which can travel over thousands of yards;

8) when shooting a sniper rifle at high angles the gravitational forces placed upon the rifle's bullet is very different than shooting a sniper rifle over a flat terrain, and the longer distance of hypotenuse length of travel;

9) most military locations on the eastern seaboard of the United States do not have facilities to train for long range high-angle sniping; and 10) the training for shooting sniper rifles at high angles versus flat trajectory is a very specific type of sniper training, which is required by the United States Armed Forces and hunter of different types of animals whose habitat is in mountainous terrain.

Taking all of these facts into account, HART facilities are proposed to be constructed with CCR to elevations from existing ground level to heights in excess of 150 feet and increasing in height from 150 feet to the maximum height that will be allowed by availability of CCR material, site constraints and the end user design criteria.

Concerning safety of all on-site and off-site persons and property, the Long Range HART facility's CCR structure will be of a depth to make sure no modern rifle ammunition will have a bullet that will travel past the depth of the CCR structure. The design of the CCR structure will allow for future improvements as advancements in weapon technology are made. The starting distance will be located from "sniper hides" which will be constructed out of CCR and hydrated lime and/or cement in addition to roof structures, which will be constructed of other common construction materials, which may include poured-in-place concrete, precast concrete or steel.

The sniper hides will be individually designed so the sniper inside the sniper hide will not physically be able to shoot at an angle that will let the bullet leave the firing range at an unsafe angle. The width of the CCR structure will be such that allows for safety of the rifle's bullet staying within the physical area of the firing range while working in conjunction with the specific design of each sniper hides.

The HART facility will be designed to allow for shooting both high angle in the upward and downward shooting scenarios and situations. The downward high-angle training will include sniper hides located on the side of the CCR structures that allow shooting downward at different angles into the firing range. The upward training will be in the form of shooting at different angles from the sniper hides into the static CCR structure. The facility may also be designed for counter-sniping (snipers camouflaged against other camouflaged and hidden snipers if the site is not restrained in geophysical properties and the availability of CCR and the requirements of the site's end user.)

In light of the above considerations, FIGS. 11-15 show several views of a High-Angle Rifle Training ("HART") facility using CCR as an integral part of the facility. Precision high-angle shooting is an art form in its own right. High-angle shooting is described as when the rifle is sighted-in (zeroed) on a level or nearly level range, and then it is fired in an up-hill or downhill direction, such as either from a mountaintop or tall building onto a target below or from the ground shooting to the static structure above.

Figure 11:
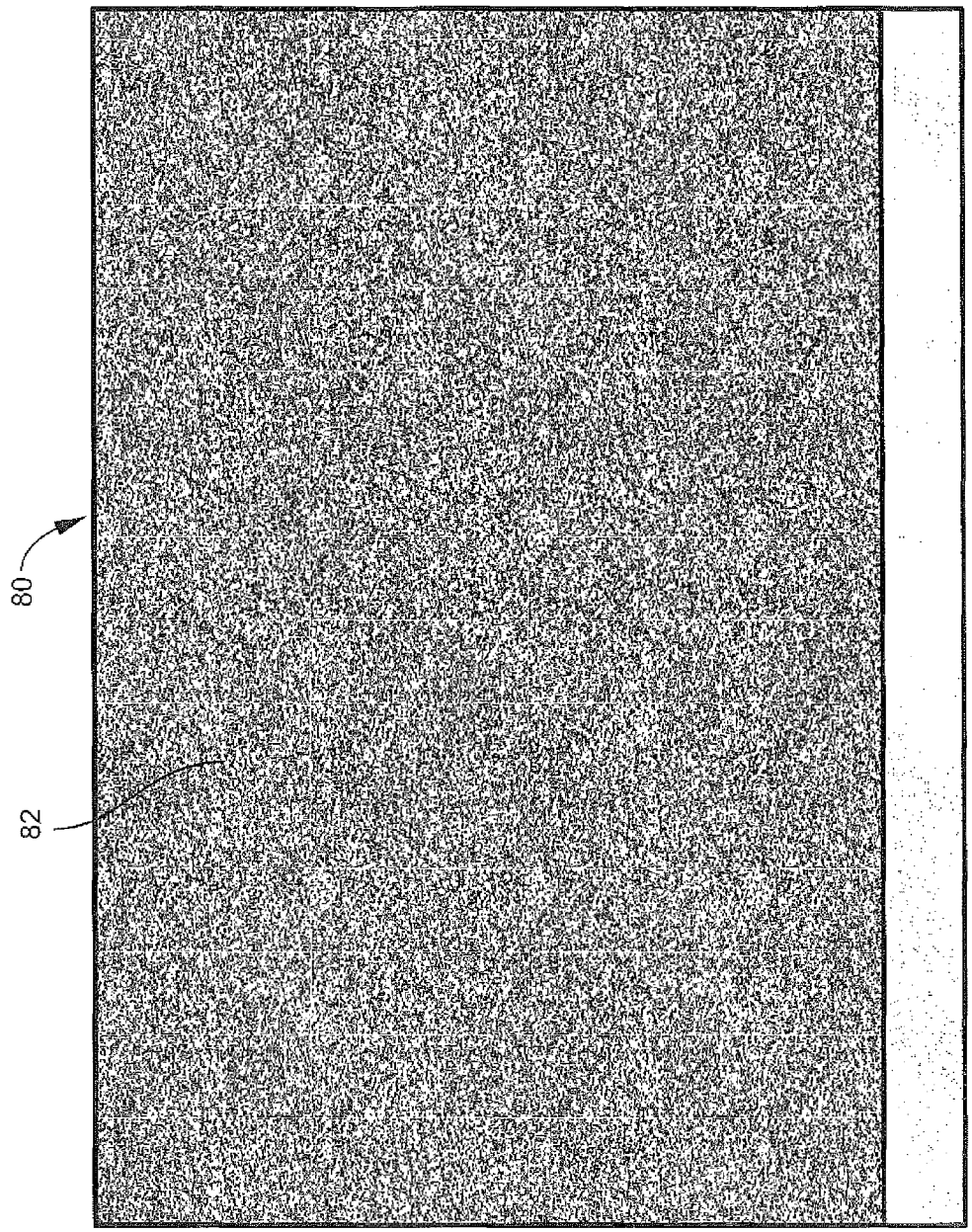
FIG. 11 shows a plan view of a high-angle rifle training facility.

FIG. 11 is a plan view of a HART facility 80 that utilizes CCR as an overlying layer of material 82 covering essentially the entire area of potential fire. The area may be any suitable size and/or shape.

Figure 12:
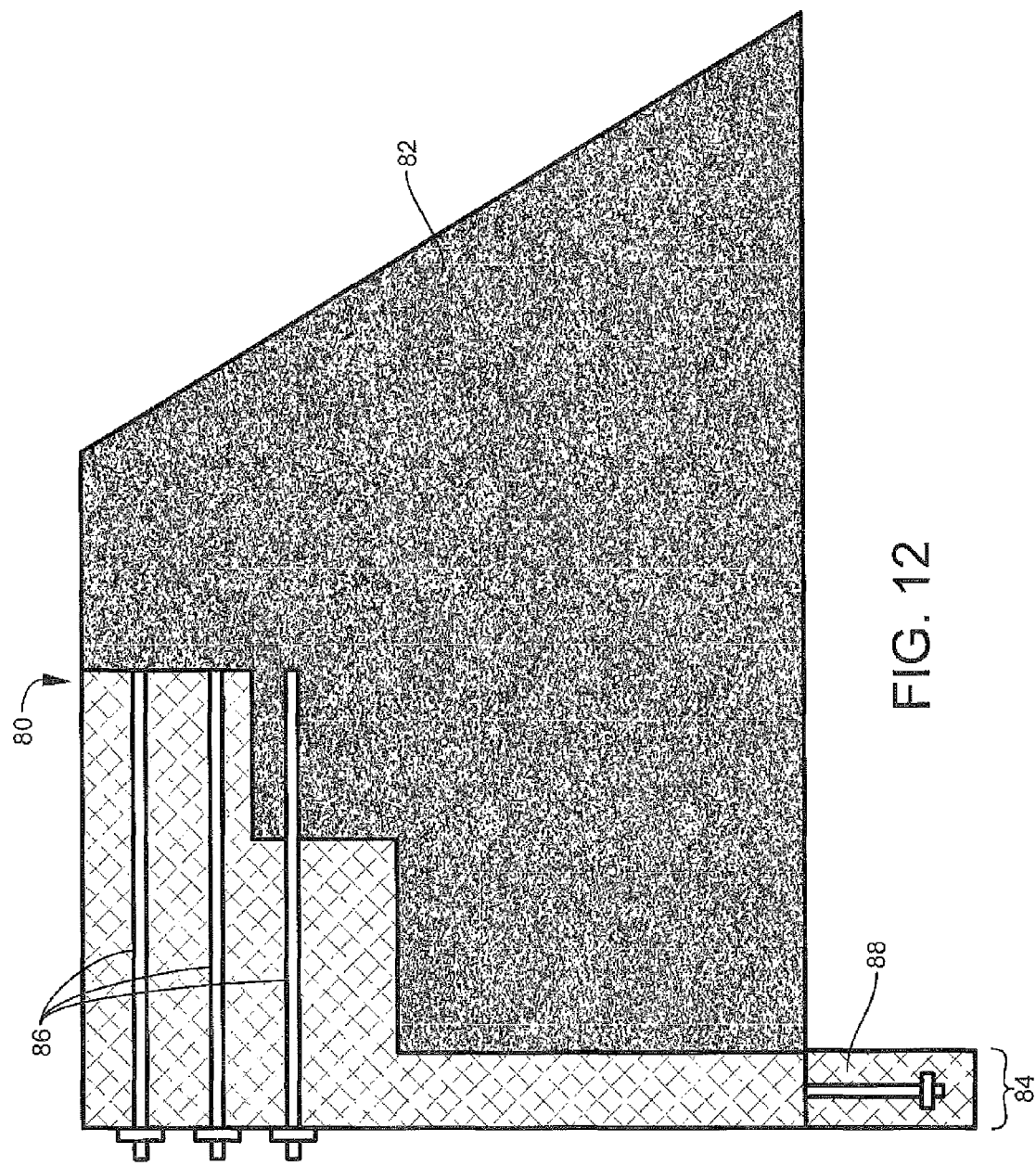
FIG. 12 shows a cross-section of a high-angle rifle training facility.

FIG. 12 illustrates that the firing position 84 which can be the entire area of the planar top edge along the nearly vertical CCR top. To achieve structural integrity, the method of application may include the use of deep foundations, vertical systems embedded into existing soils and/or rock that have adequate pullout strength, encapsulated post-tensioning or un-encapsulated post-tensioning and dead-man tieback systems or a combination of the above applications and methods. In FIG. 12, dead-man tiebacks 86 provide the needed reinforcement on the upper portion of the firing position 84, and post-tension anchors 88 set into the sub-surface provide the needed deep dimensional stability when used in conjunction with post-tensioning.

Figure 13:
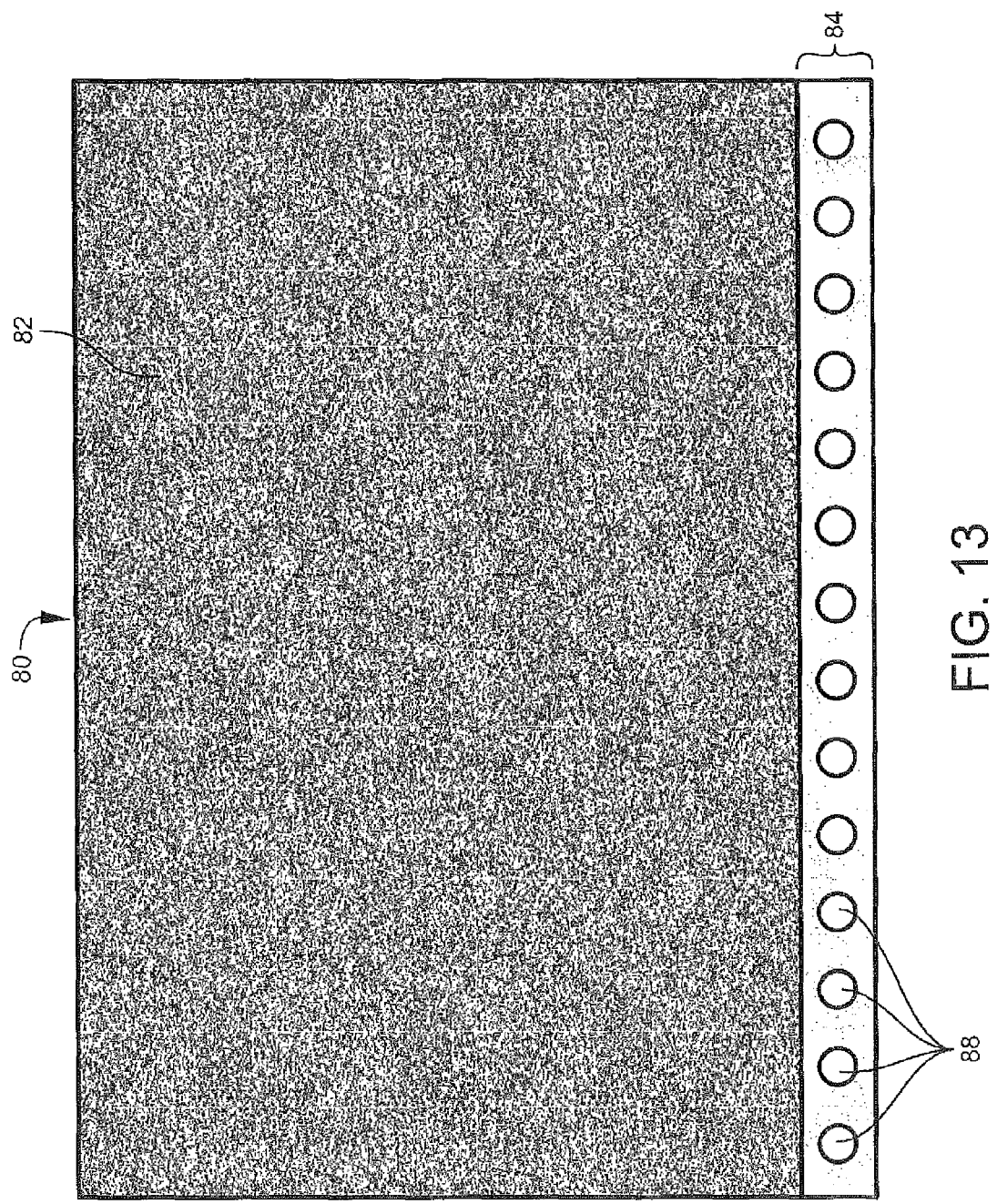
FIG. 13 shows a plan view of a caisson foundation for a high angle of repose CCR wall.

FIG. 13 shows a plan view of a caisson deep foundation system 88, with a spaced-part lateral array of encapsulated post-tension anchors 88 used to construct a nearly vertical wall at the firing position 84.

Figure 14:
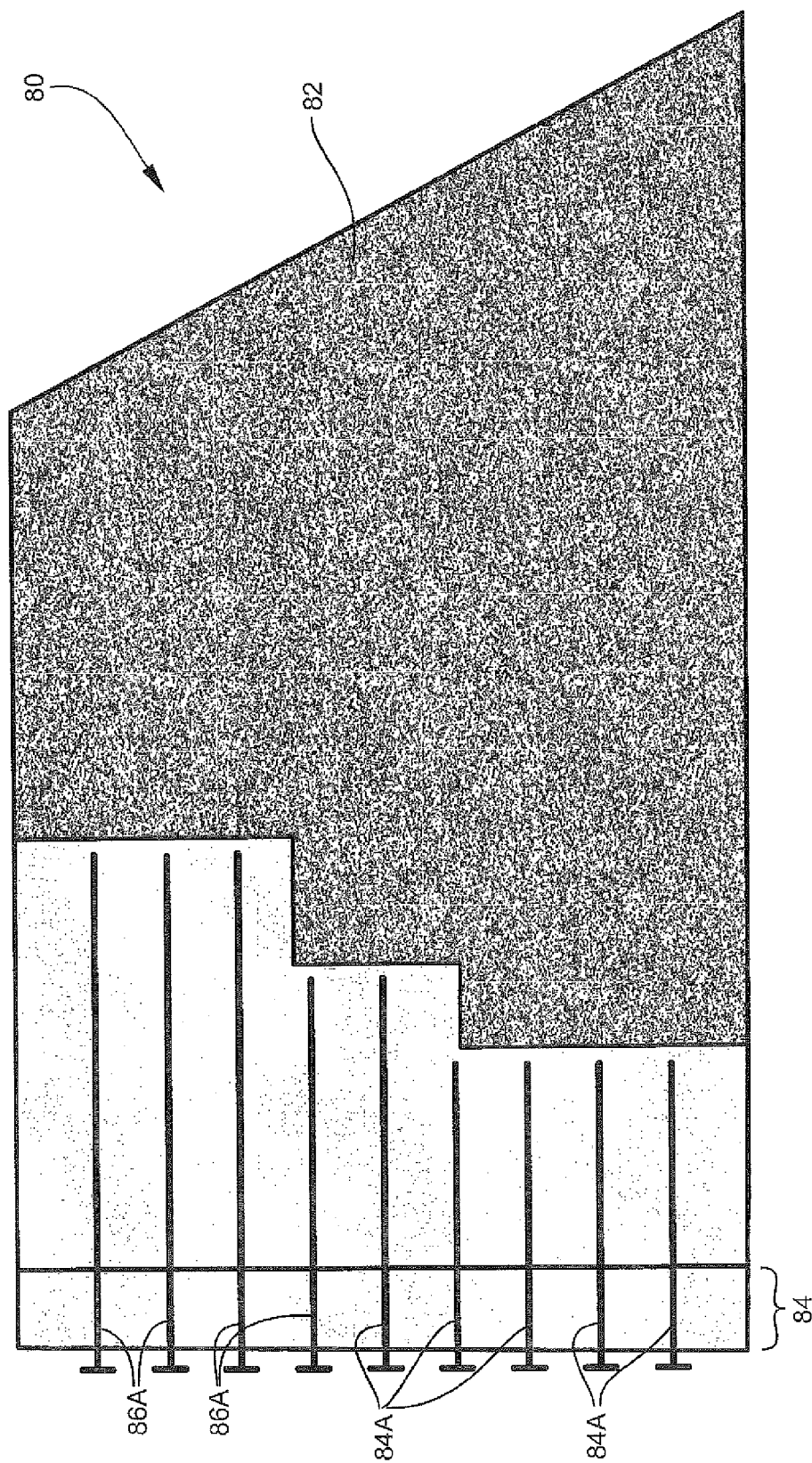
FIG. 14 shows a cross-section of a tieback system for a high angle of repose wall.

FIG. 14 shows a cross-section of an alternative design where a tieback system 86A is used for the entire height of the nearly vertical wall in lieu of tieback and post-tensioning used in conjunction as shown on FIG. 12. The CCR used in the tieback area will have a formulated mix design to give the CCR increased pullout strength whereas to support the entire tieback system.

The CCR mix design formulations for deep foundation caissons will include commercially available admixtures to help reduce segregation of the different course and fine particles when the material is placed into the caisson. Depending on the specific soil type; auger cast, vibroflatation, dynamic compaction, and/or concrete footings could be used to strengthen the foundation system, which supports the nearly vertical wall portion of the static structure.

Figure 15:
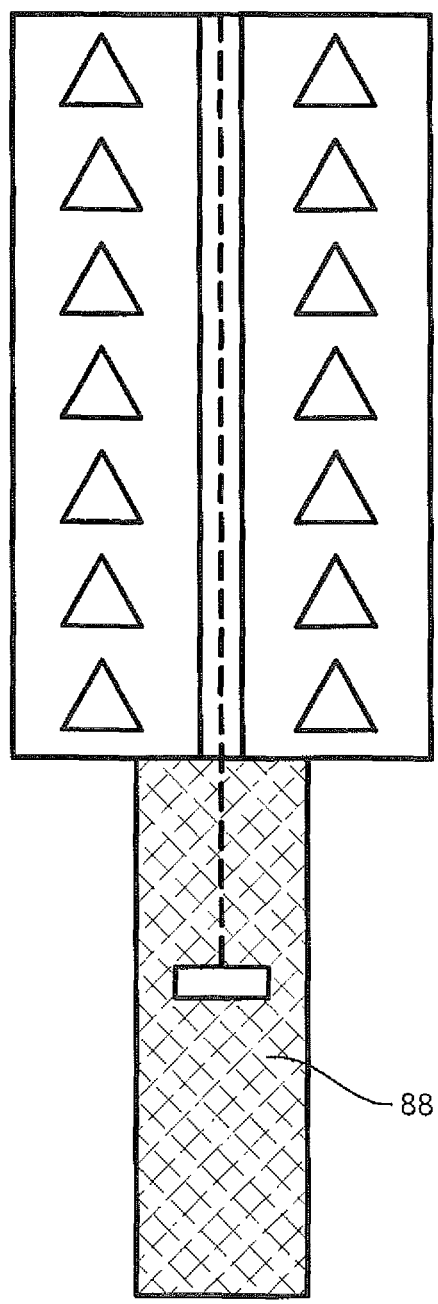
FIG. 15 shows a section cut of a caisson foundation system for a high angle of repose CCR wall.

FIG. 15 shows a cross-section of an alternative design were the vertical use of post-tensioning is used in lieu of the dead-man tieback system shown in FIG. 14. In FIG. 15, the fortified section will, in most instances, be a specifically designed Roller Compacted Concrete.

As with all of the mix design formulation for a wall of nearly vertical properties, the CCR will be formulated for the specific design requirements. As outlined above, the formulation of CCR mix design will include one or more of cement, Class C ash, lime, other type of ash from circulating fluidized bed and other naturally occurring pozzolan materials and commercially available admixtures in addition to water and other reagents, as required.

Formulation and Application No. 4—Synthetic Soil

The facility may also be designed for counter-sniping (snipers camouflaged against other camouflaged and hidden snipers if the site is not restrained in geophysical properties and it is a requirement of the site's end user).

Figure 16:
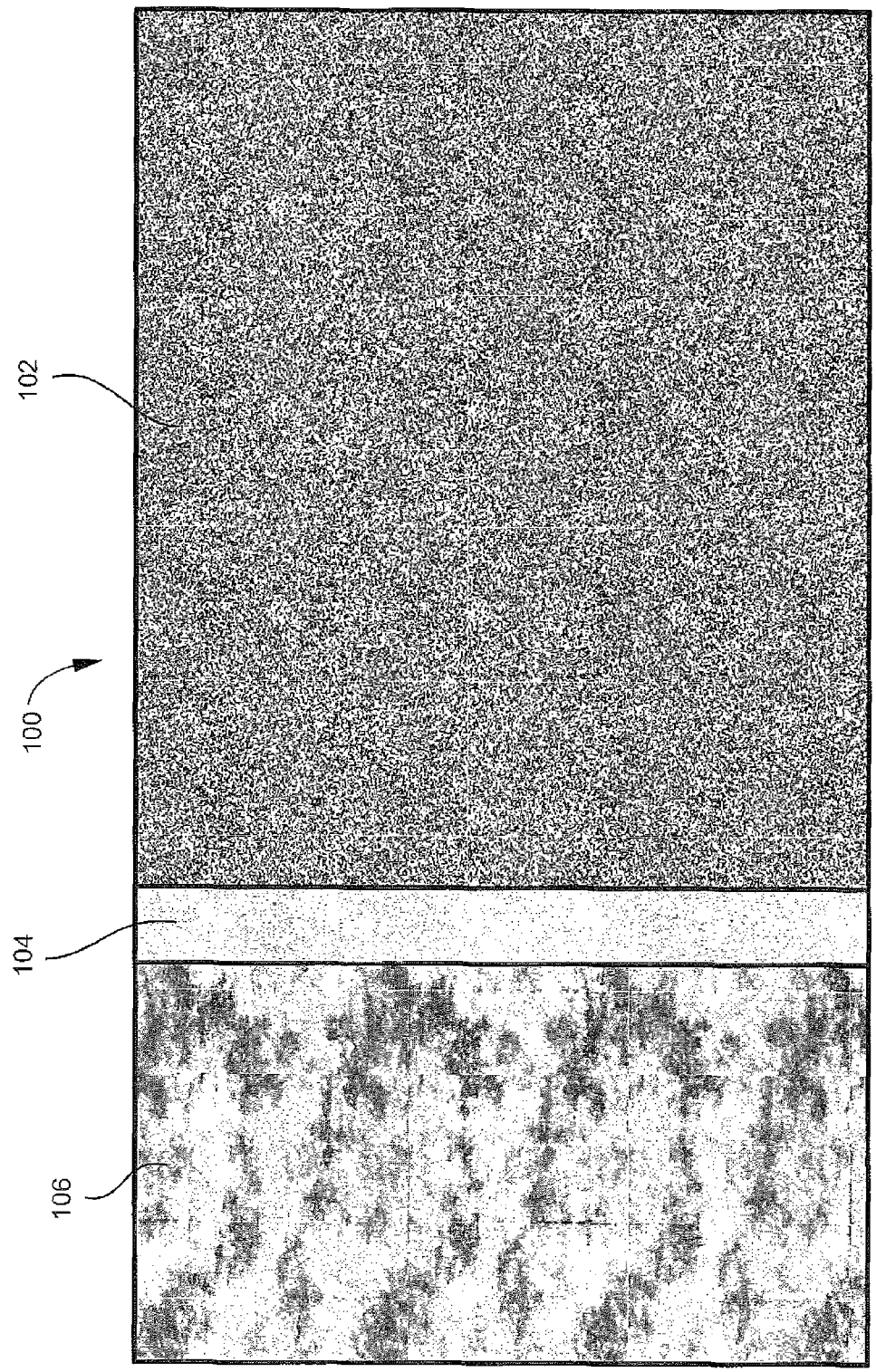
FIG. 16 shows a plan view of a high-angle rifle training facility with synthetic soil added around certain areas of the facility.

FIG. 16 shows a plan view of a HART facility 100 that utilizes CCR as a component of the static structure 102. The area may be any suitable size and/or shape. A vertical wall 104 extends along the width of the area. The HART facility 100 is provided with synthetic soil 106 added around certain areas of the compacted CCR 102 to increase the usefulness of the HART facility 100. Sniper hides, not shown, may be placed at any suitable position for both upward-angled shooting or downward-angled shooting.

Figure 17:
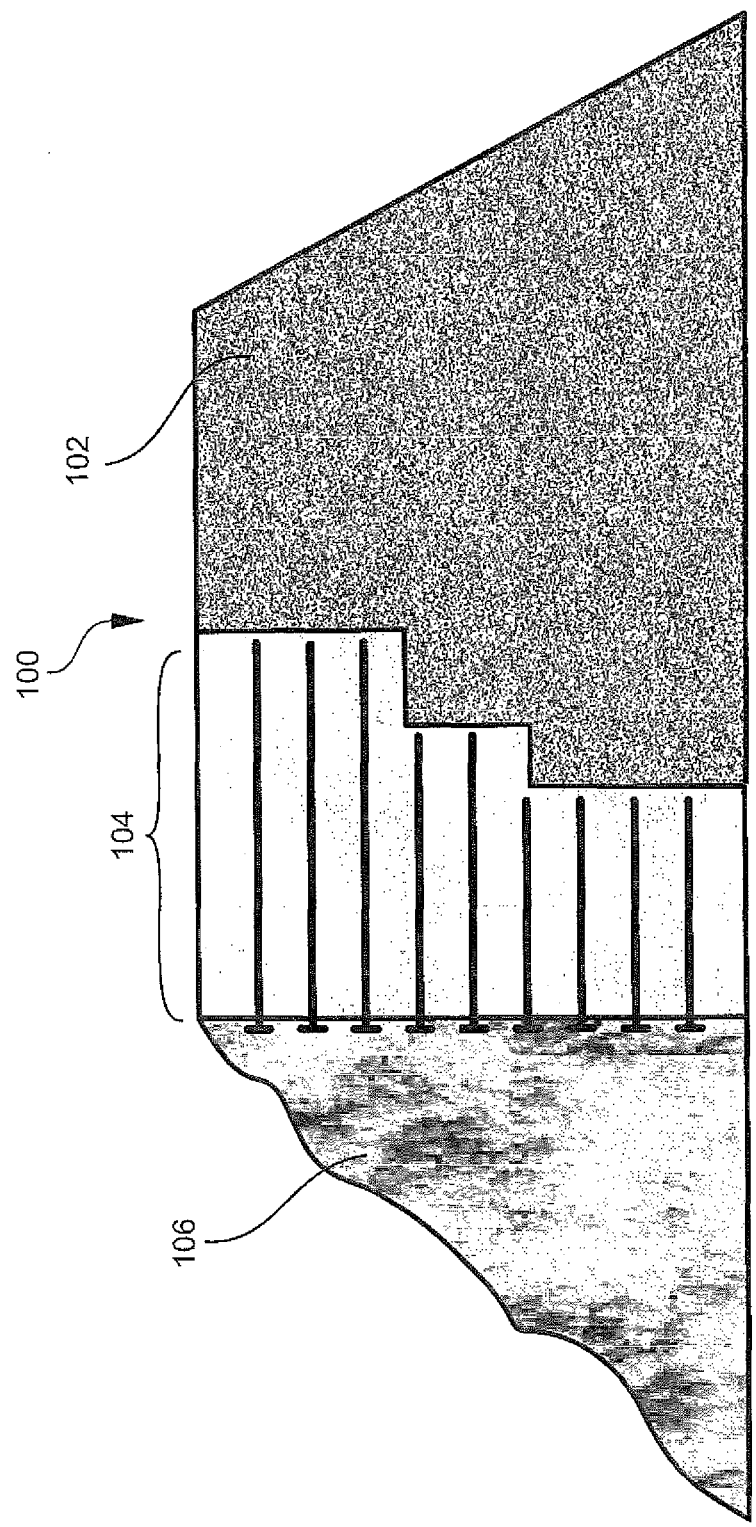
FIG. 17 shows a cross-section of a high-angle rifle training facility with synthetic soil added around certain areas of the facility.

FIG. 17 shows a cross-section of the HART facility 100 illustrating that the synthetic soil 106 may be graded as desired to increase the usefulness of the designed facility, if the organic ingredients of food waste and bio-solids are not economically available to make the configuration of the static structure as required, compacted CCR can be used in lieu of synthetic soil.

CCR can be mixed with organics and composted to produce the synthetic soil 106, which will be used on the top and the sides of the CCR structure. Specifically, bio-solids and food waste can be mixed with CCR in which the CCR will act as a solidifying agent prior to the start of composting. The synthetic soil 106 may be applied to the CCR facility 100 in order to provide camouflage, heat signature reduction, shapes, configuration and soil depth for vegetation of different trees and vegetation types, which will not harm the protective liner system on the tops and the sides of the CCR structure.

The synthetic soil produced from CCR and organics may be used as a protective perimeter to the CCR structure as required by the United States DoD, or other end users.

Formulation and Application No. 5—Slide Top Zones

Figure 18:
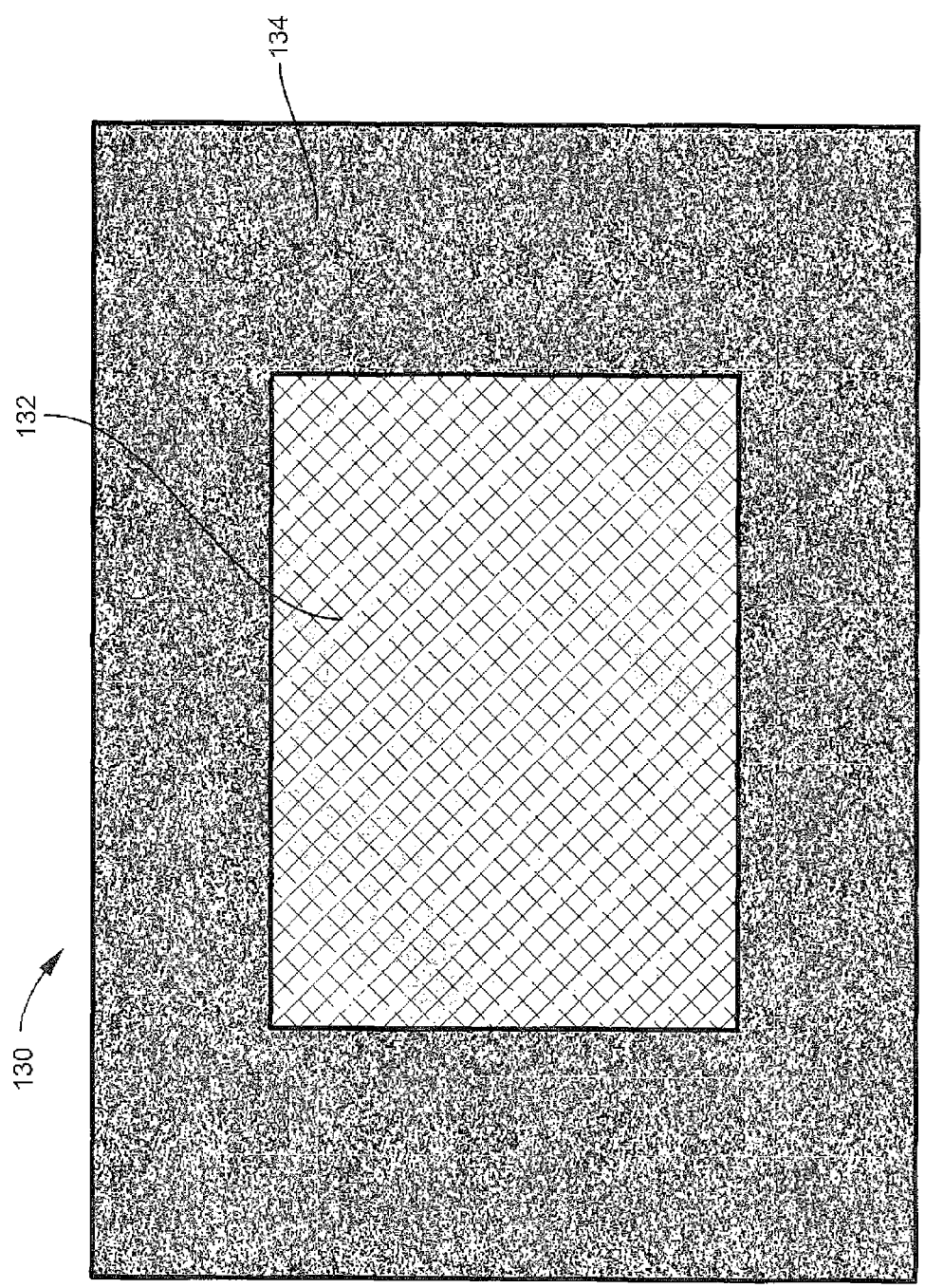
FIG. 18 shows a plan view of a slide top zone.
Figure 19:
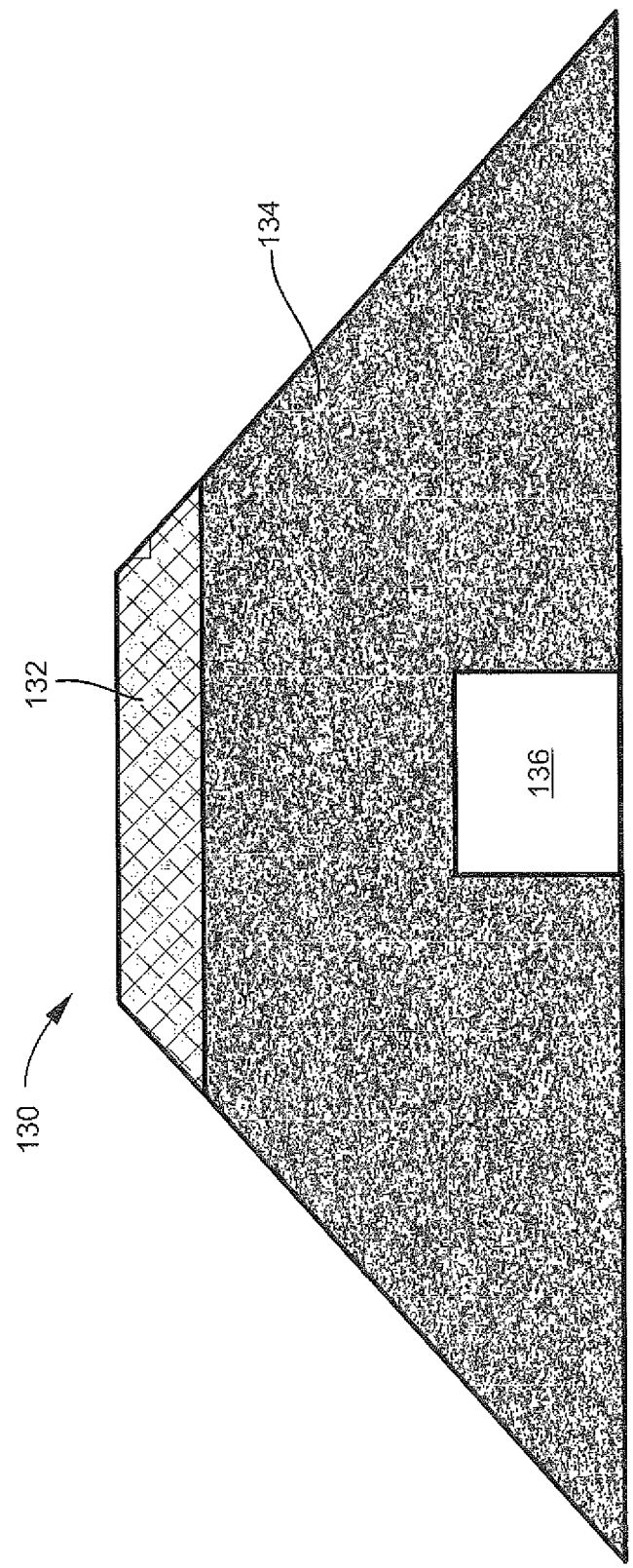
FIG. 19 shows a cross-section of a slide top zone.

Referring now to FIGS. 18 and 19, slide top zones are shown. These structures dissipate forces created by bombs, earthquakes and weapons and provide a self-healing structure as described below and depicted in FIG. 20.

FIGS. 18 and 19 illustrate an enclosure 130 that includes a centrally positioned cap forming a slide top zone 132 that sits atop an impact zone 134. The enclosure 130 defines an interior volume 136.

The slide top zone 132 is constructed with waste tires and/or CCR aggregates formulated in the same method as the absorption zone aggregates described above. The size of the CCR aggregate will vary in size as required by the end user of the beneficial use.

The application of the CCR in aggregates sized configuration, allows for the CCR aggregates to not be bound as tightly together as compacted CCR. Upon the impact of exterior forces to the static structure, which contains a slide top constructed with CCR aggregates, the forces will move the CCR of least resistances, which is the slide top aggregates, in lieu of transmitting the forces to other areas of the static structure.

Another important feature of the aggregate slide top is that with the recent advancement of earth penetrating bombs, (https//fas.org/blogs/security/2016/01/b61-12 earth-penetration/) if the top is designed of sufficient dimensions, the slide top can stop the penetration of the bomb and at that time of detonation of the bomb, the forces will dissipate away from the structure in lieu of the forces being transmitted to the static structure and after the detonation.

The thickness and dimensions of the slide top zones can vary in size as required by the DoD or other end users.

Formulation and Application No. 6—Self-Healing Structures

Similar to the United States Defense Advanced Research Projects Agency (DARPA) which has launched their Engineered Living Materials (ELM) program (http://www.darpa.mil/news-events/2016-08-05), this patent application contains disclosures of enclosures that have self-healing design features and which incorporate fortified zones, blast/impact zones, slide top zones and CCR aggregates.

Figure 20:
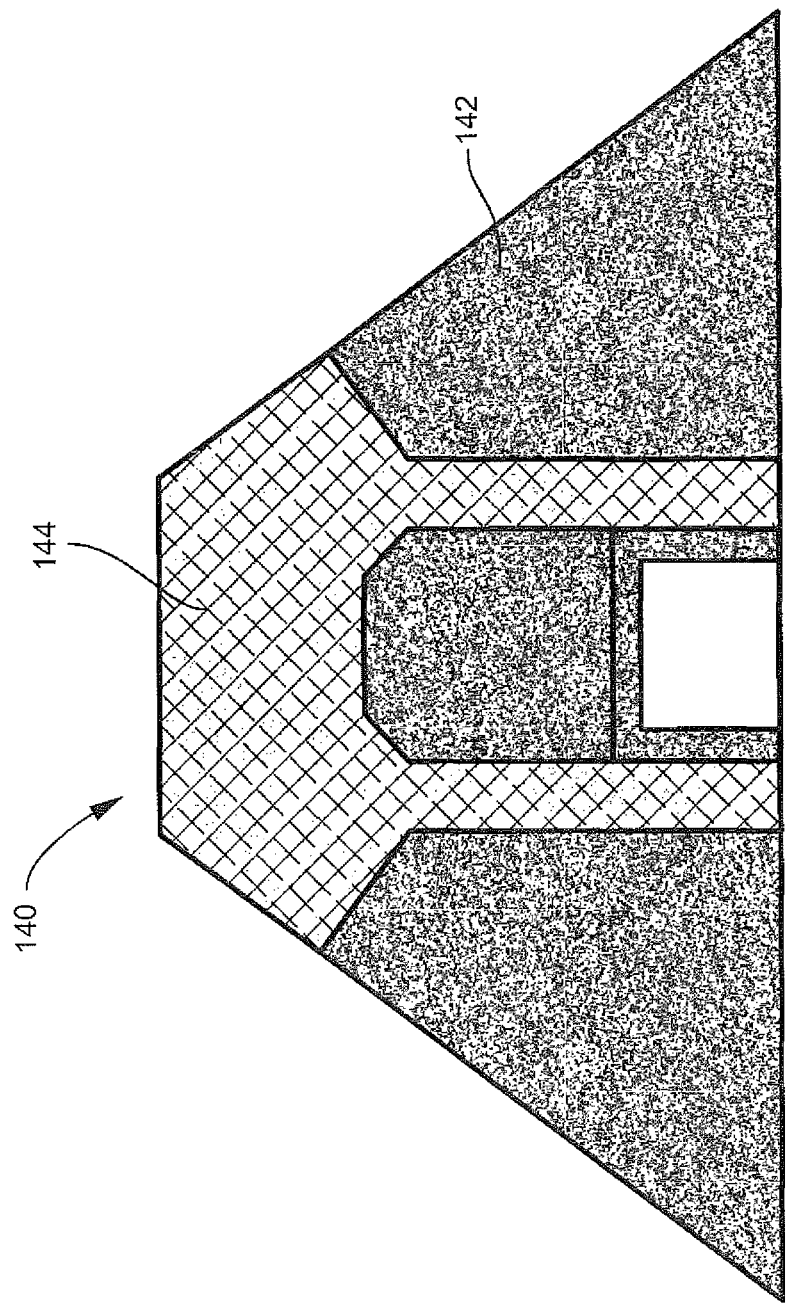
FIG. 20 shows a cross-section of a self-healing structure.

FIG. 20 shows a cross-section of a self-healing enclosure 140 that includes structural features utilizing CCR.

The enclosure 140 is designed so that if weapons destroy the front facing CCR absorption and/or hardened zones 142 and the destructive forces make it to the self-healing slide top CCR aggregate zone 144, then the CCR aggregates and/or ground tires will feed downward by gravity to replenish protective CCR aggregated in the CCR self-healing zone 144. If the destructive forces are concentrated at the upper level of the enclosure 140, the slide top zone 144, which can also serve as the replenishing material, will help dissipate the destructive energy. Exterior perimeter walls around a static structure can also have this self-healing feature incorporated into the design for increased protection.

Formulation and Application No. 7—Hardened Shell

Figure 21:
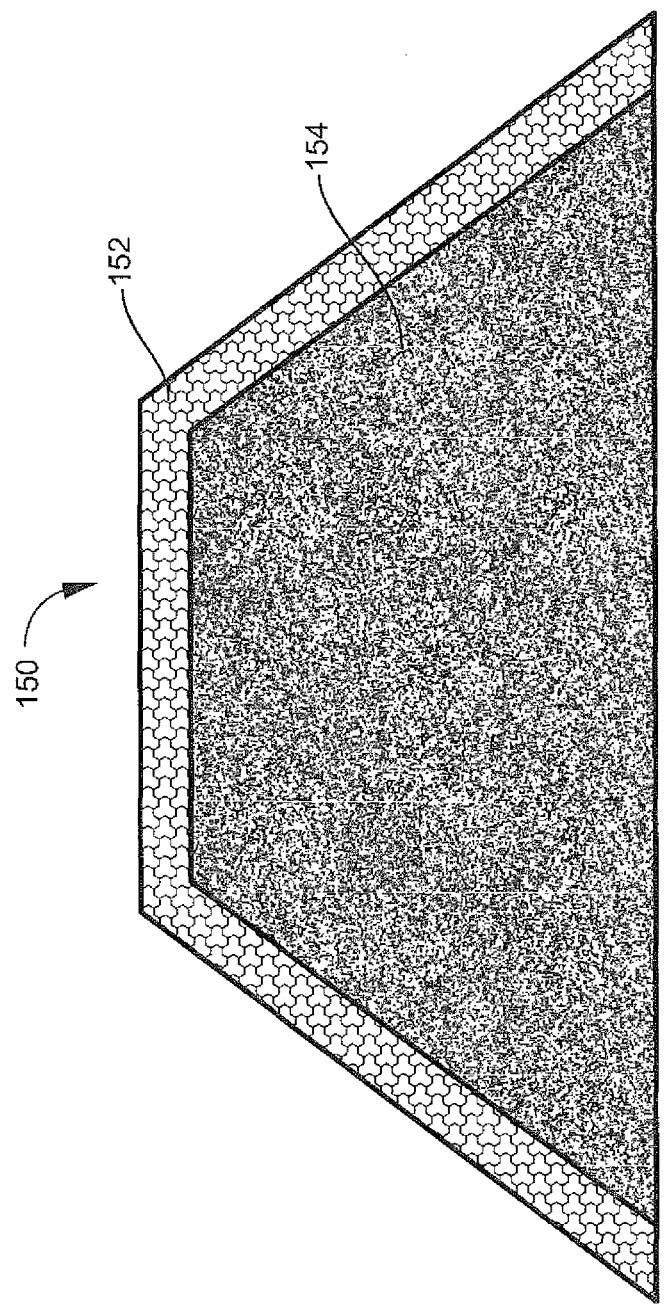
FIG. 21 shows a cross-section of a CCR hardened shell.

FIG. 21 shows a cross-section of a structure 150 that has a hardened shell 152 for protection from external forces and for the added benefit of providing an increased angle of repose to the CCR material 154. The CCR material in the hardened shell area will be formulated based upon the type of ash material used in the mix design and the strength required by the beneficial end user. The process is the formulation of a mix design and the application to the static structure by either roller compaction methods or using road reclaimers for the mixing of the addition of lime, cement, Class C ash, CFB ash, and other naturally occurring materials, which contain pozzolan materials and/or commercially available admixtures and products. The natural angle of repose will be increased over compacted CCR due to the mix design formulation under this application.

Formulation and Application No. 8—Low Leaching and Low Permeability

One of the requirements under the EPA's rule for the use of CCR material to be considered beneficially used is: " . . . when un-encapsulated use of CCR involves placement on land of 12,400 tons or more in non-roadway applications, the user must demonstrate and keep records, and provide such documentation upon request, that environmental releases to groundwater, surface water, soil and air are comparable to or lower than those from analogous products made without CCR, or that environmental releases to groundwater, surface water, soil and air will be at or below relevant regulatory and health-based benchmarks for human and ecological receptors during use." The hardened shell 152 can also contain a mix design formula that will provide for, in addition, to hardened protection, low leaching and low permeability as described below.

A landfill that receives CCR for "disposal" as defined by the EPA CCR Rule, in lieu of the CCR being beneficially used, must be disposed of in a regulated landfill which will have a liner system as is required for sub-title D solid waste landfills.

Figure 22:
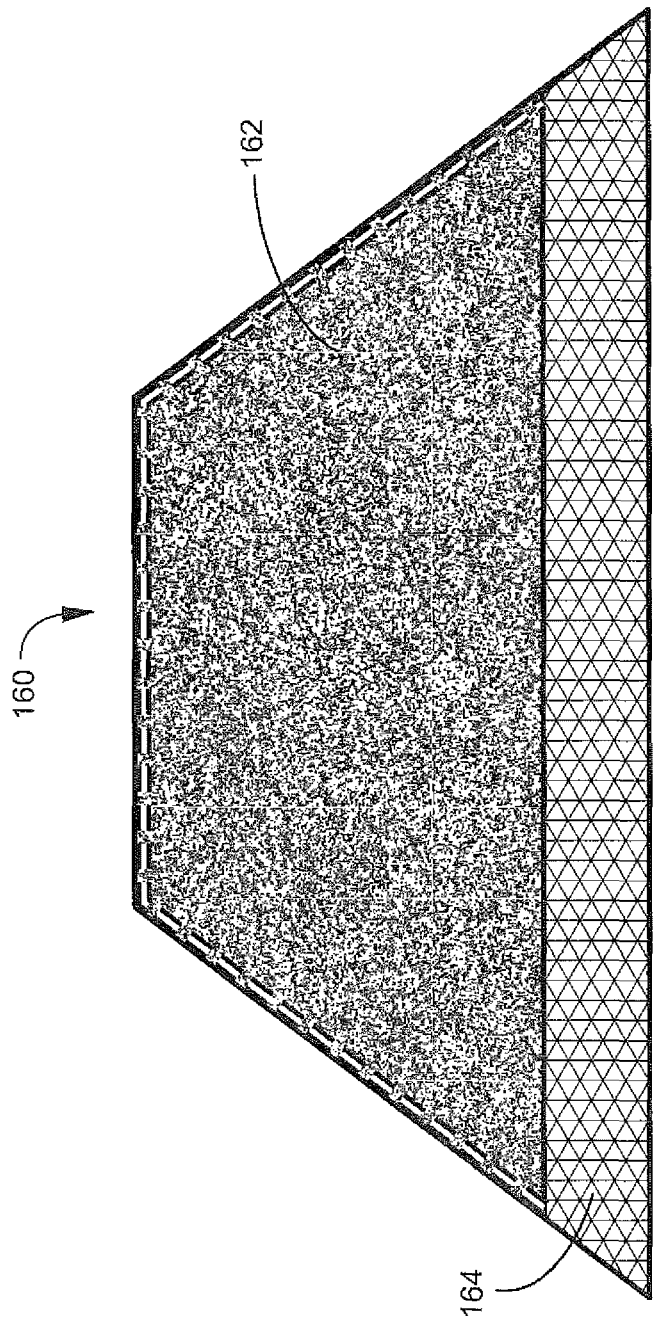
FIG. 22 shows a cross-section of a low leaching and a low permeability base layer section.

FIG. 22 shows a cross-section of a structure 160 having a solid core 162 on a hardened low permeability base 164 that can meet the requirements of EPA criteria for beneficial use. The formulation of the CCR mix design will have two additional design criteria in addition to the strength and workability, in that the leachability and the permeability of the base 164 will be taken into consideration. The CCR mix design that is formulated for the base 164 will have to keep all regulated constituents that are within the above compacted and unformulated CCR within the core 162. The low permeability base 164 mix design will require the CCR formulation to have a very low leaching and permeability. This will be accomplished by adding additional commercially available admixtures to the formulation but may also include a combination of increasing the percentage of the binding agents of the CCR mix design. Certain beneficial end users may require a sub-title D liner system (both bottom and cover cap liner) in lieu of or in addition to the CCR formulated low permeability base 164. The use of a sub-title D liner does not classify the static structure as disposal, nor does it not negate the classification of the formulations and applications of CCR under this invention as beneficial use as defined by the EPA CCR rules. The mix design for the hardened shell 152 as shown in FIG. 21 may include the same formulation criteria for low permeability and leachability of CCR constituents. A Toxicity Characteristic Leaching Procedure (TCLP) as outlined by the EPA is the accepted method to determine the leaching characteristics of a material (https://www.epa.gov/hw-sw846/sw-846-test-method-1311-toxicity-characteristic-leaching-procedure). The low leaching and low permeability may be specified by the beneficial end user to replace all or a portion of some of the sub-title D liner requirements for waste disposal. Some beneficial end users may require a sub-title liner system and this invention can work in conjunction within those specified requirements.

Sub-title D liner requirements include:

Parts of a Landfill

The main components of sub-title D permitted landfill include a bottom liner that separates and prevents the buried waste from coming in contact with underlying natural soils and groundwater. In municipal solid waste landfills, the bottom liners are generally constructed using some type of durable, puncture-resistant synthetic plastic HDPE (high-density polyethylene) ranging from 30 to 100 mils thick. The plastic liners may also be designed with a combination of compacted clay soils, along with synthetic plastic for use in an area in a landfill that has been constructed and approved for disposal of waste. These cells range in size (depending upon total tons of waste received each day at the landfill) from a few acres to as large as 20+ acres. Inside these larger cells, are smaller cells known as the daily workface or sometimes referred to as cells. This is where the waste coming into the landfill for disposal that day is prepared by placing the material in layers or lifts where the waste is then compacted and shredded by heavy landfill compaction machinery.

Leachate Collection System

The bottom of each landfill is typically designed so that the bottom surface of the landfill is sloped to a low point, called a sump. This is where any liquids that are trapped inside the landfill—known in the waste industry as leachate—are collected and removed from the landfill. The leachate collection system typically consists of a series of perforated pipes, gravel packs and a layer of sand or gravel placed in the bottom of the landfill. Once the leachate is removed from the sump, it is typically pumped or gravity-flowed to a holding tank or pond, where it is treated either on-site or hauled off-site to a public or private wastewater treatment facility.

Storm Water Drainage

This is an engineered system designed to control water runoff during rain or storm events. This is done by directing the runoff through a series of berms or ditches to holding areas known as seed ponds. In these ponds, the runoff water flow is slowed down or held long enough to allow the suspended soil particles to settle out before the water is discharged off site.

Methane Collection System

Bacteria in the landfill will breakdown the trash in the absence of oxygen. This process produces landfill gas, which is approximately 50 percent methane. Since methane gas has the potential to burn or explode, it has to be removed from the landfill. To do this, a series of pipes are embedded within the landfill to collect the methane gas. This gas, once collected, can be either naturally vented or control-burned. CCR avoids this gas production, since the combustible constituents have previously been consumed. Methane is an issue with household waste—CCR does not produce methane.

Cover (or Cap)

Waste that is placed in a cell is required to be covered daily with either six inches of compacted soil or an alternative daily cover. Some examples of alternative daily cover are the application of spray-on cover material, such as foam or a flame-retardant fiber material. Another type of alternative daily cover is large panels of tarpaulin-type material that is laid over the waste at the end of each day and removed the next day before waste is placed. Other areas within the cells that are not to final grade and will not receive placement of additional waste for a period of time may require additional cover. This is known as intermediate cover—generally 12 to 18 inches of soil. Covering (or capping) is performed in order to isolate the waste from exposure to the air, pests (such as birds, rats and mice) and to control odors. When a section of the landfill is finished or filled to capacity, it is permanently covered with a combination of a layer of polyethylene plastic, compacted soil and a layer of topsoil that will support growth of vegetation to prevent erosion.

Groundwater Monitoring Stations

These groundwater-monitoring stations are set up to directly access and test the groundwater around the landfill for presence of leachate chemicals. Typically, a groundwater monitoring system will have a series of wells that are located up gradient of the landfill disposal area and a series of wells down gradient. The up gradient wells test the water quality before it moves under the disposal area in order to get a background analysis of the water. The down-gradient wells then allow testing of the water after it has passed under the disposal area so it can be compared to the quality of the up-gradient wells to make sure there has been no impact or contamination of the groundwater.

Conclusion

The beneficial end users of this invention will have different design criteria along with different types of CCR from which to begin the CCR mix design formulation. The degree in which each component of the invention as outlined in FIGS. 1-33 of this application are used in any particular static structure can vary to a large degree. Beneficial end users could conceivably have a structure that consists of many parts of this invention, yet on the other end of the design requirements the beneficial end user may have a static structure that has a conventional sub-title D base liner system and is mainly comprised of compacted CCR that may or may not be around an interior space. Even if every component of this invention is used in a single static structure such as a HART facility, there may be large areas of CCR, as delivered, which will be conditioned to acceptable moisture content and then be placed and compacted in place in the static structure. In areas of the static structure where compacted CCR is used without a special formulation or application of the material other than the CCR natural features, the CCR will be wetted or dried to achieve near optional compaction and be compacted with heavy commercially available wheel, smooth drum and/or track compaction equipment.

Formulation and Application No. 9—Air Tubes

Figure 23:
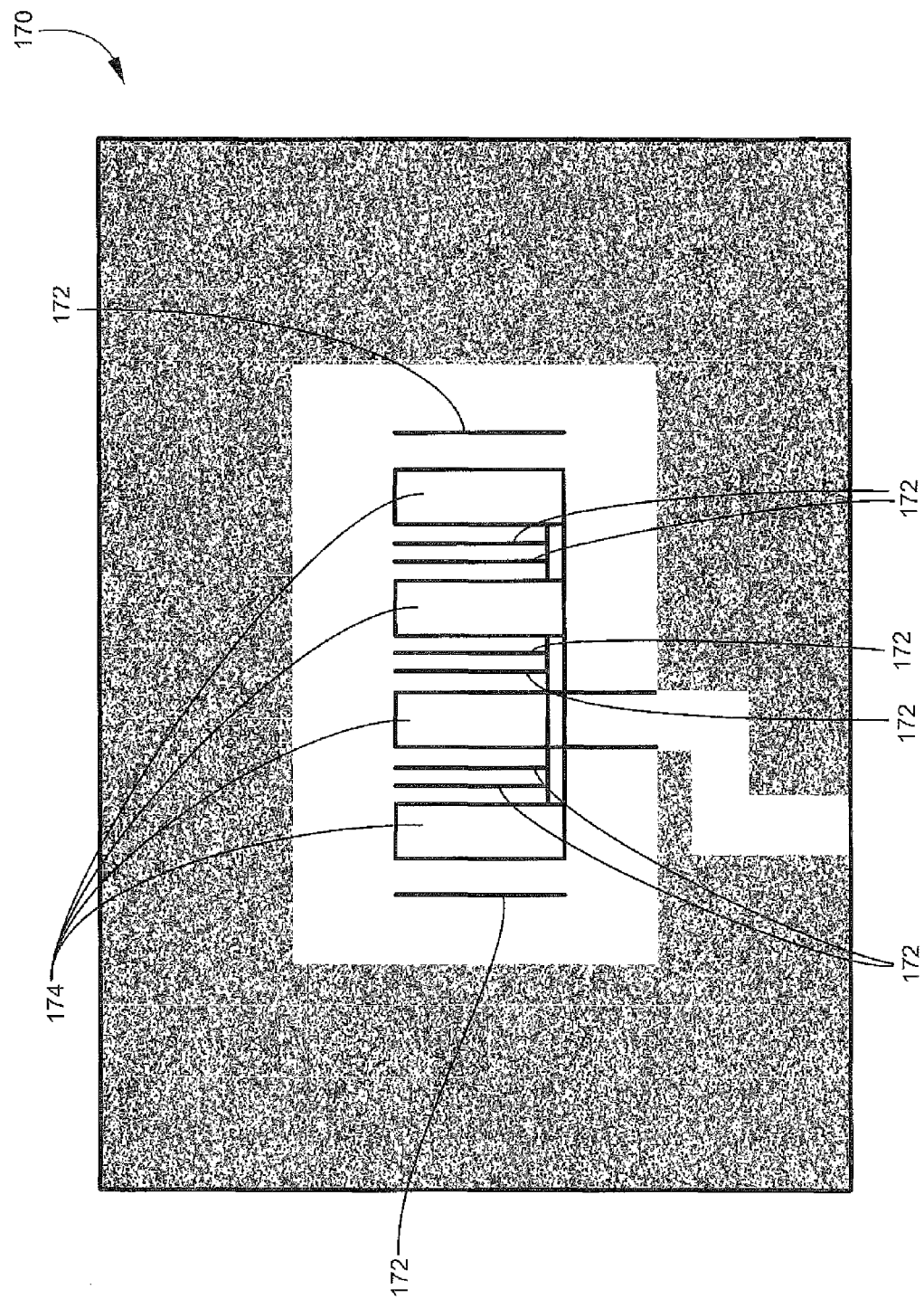
FIG. 23 shows a plan view of tubes to hold additional pressurized air for the use of life support for personnel located inside the structure.
Figure 24:
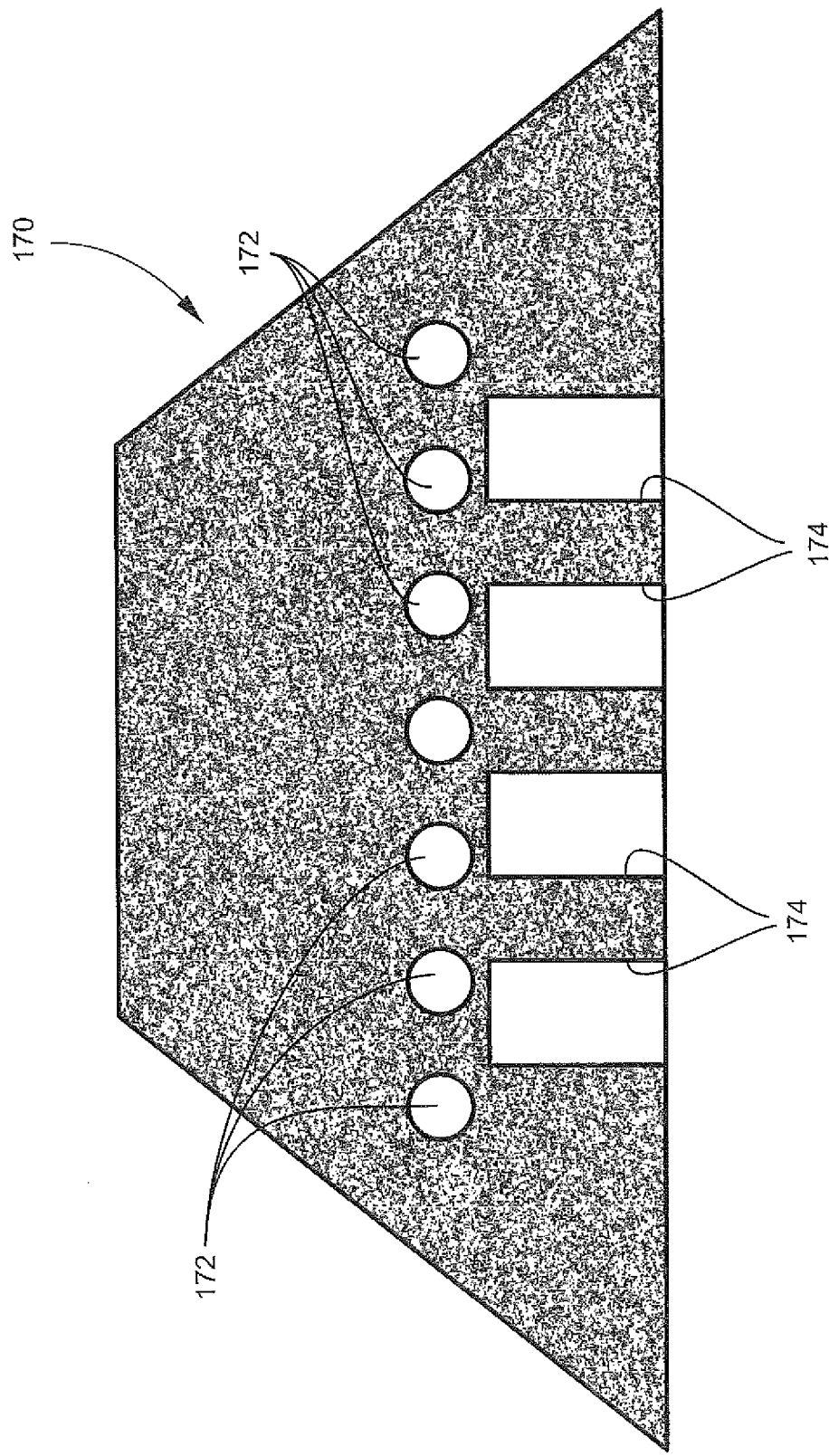
FIG. 24 shows a cross-section of these pressurized air tubes.

FIGS. 23 and 24 illustrates a hardened structure 170 constructed of CCR in accordance with the disclosure of this application that includes an array of tubes 172 to hold additional pressurized air for the use of life support for personnel located inside interior spaces 174 of the enclosure 170.

Large detonations such as may result from explosive weapons have the capability to create a vacuum caused by the intense heat and air velocity, creating the need for air to support life inside the static structure. The static structure can be designed to have air locks for the entrance/exit ways installed into the structure and have a series of small tunnels with mechanical exhaust fans connected to backup batteries to be used to dispense the air into personnel areas as required.

The CCR in these areas will be formulated with a CCR mix design similar to the fortified sections, with the addition of admixtures that will keep the air from leaving these tunnels http://usa.sika.com/en/concrete-roducts/concrete_home/concrete-admixture/watertight-concrete.html.

The process of applying this airtight CCR to the static structure will be to place a base layer of the airtight CCR mix design material for a bedding and then place reinforced concrete pipe (RCP) joined together and then compacted with this same airtight CCR material around the pipe to seal the entire length of the pipe and the surrounding areas at the beginning and end points. Behind the mechanical fans will be sliding check valves to keep the pressurized air in the RCP until such time that the air is required. The design can include sensors and air pumps to keep the RCP tubes pressurized as specified.

Pressurized air tubes may also be installed as outlined below with Micro Tunnel Boring Machines (MTBMs) in lieu of large Tunnel Boring Machines (TBM).

Formulation and Application No. 10—Tunnels

Figure 25:
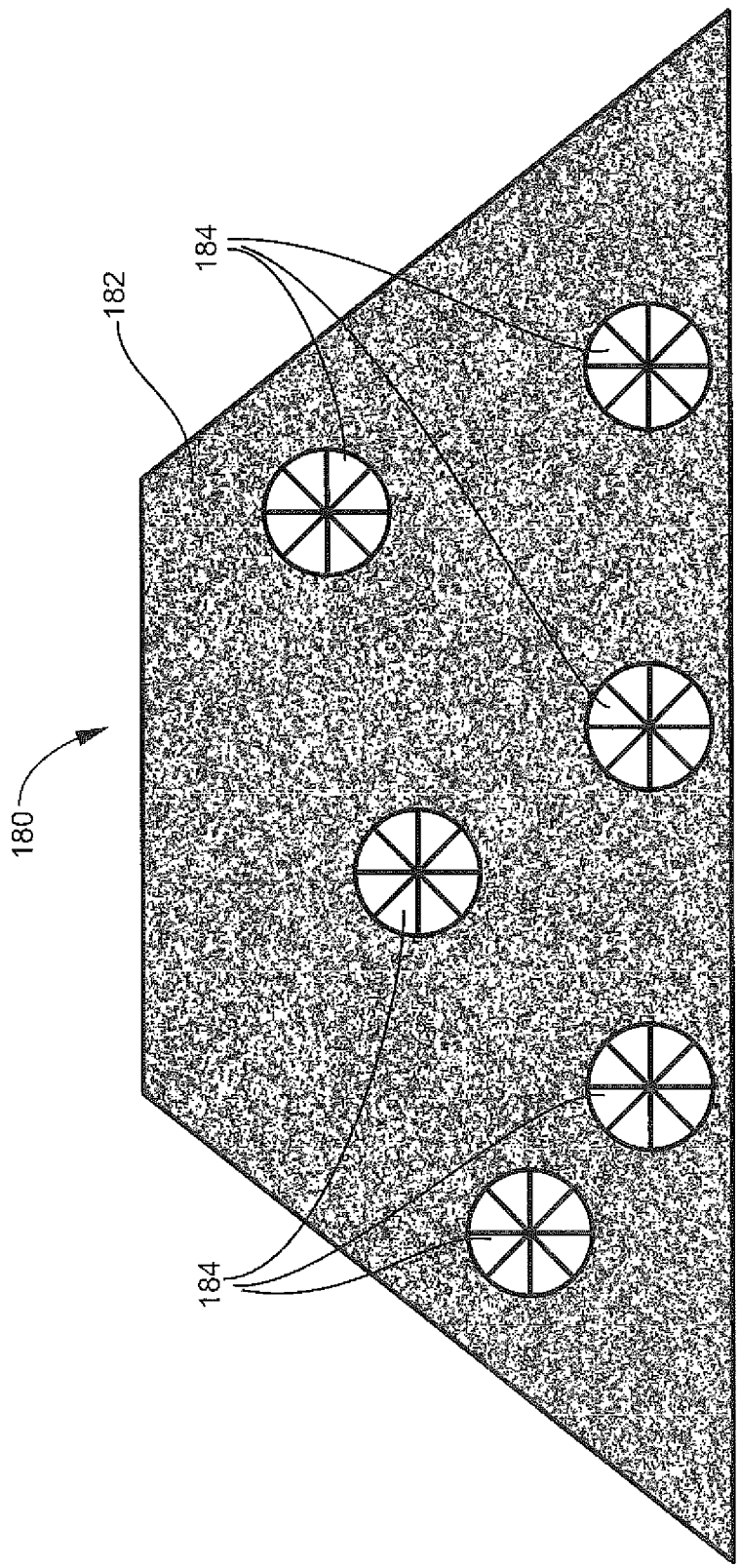
FIG. 25 shows an elevation view of large tunnels.

FIG. 25 illustrates a structure 180 constructed of CCR material 182 with large tunnels 184 installed either during the initial construction of the static structure or after completion of the first phase of construction of the structure. The structure 180 can be designed for a CCR design mix similar to the fortified CCR mix design with two of the CCR formulated mix design criteria being a tunnel having the binding and compressive strength to support tunnel circular construction but at the same time, not being so hard in compressive strength that it would require greatly increased construction cost. One method of construction would be to use a Tunnel Boring Machine (TBM) to construct these tunnels 184 as required by the beneficial end user. These types of tunnels 184 may be used in the initial construction phase or may be applied in the future, based on design changes or the availability of additional capital funding. Other known construction means and methods, such as, jacked tunnel construction and earth tunneling with steel supports can be used in the creating of these tunnels and though the CCR formulated mix design criteria may vary in slight detail, it will be the same in concept. The tunnels 184 can be constructed large enough to be used as interior spaces or they can be used for conveying air, water, freight, personnel or other material depending on size. The same CCR formulation can be used to install vertical drilled shafts for either ventilation or retractable communication antennas.

Formulation and Application No. 11—EMP Protection Static Structures

Figure 26:
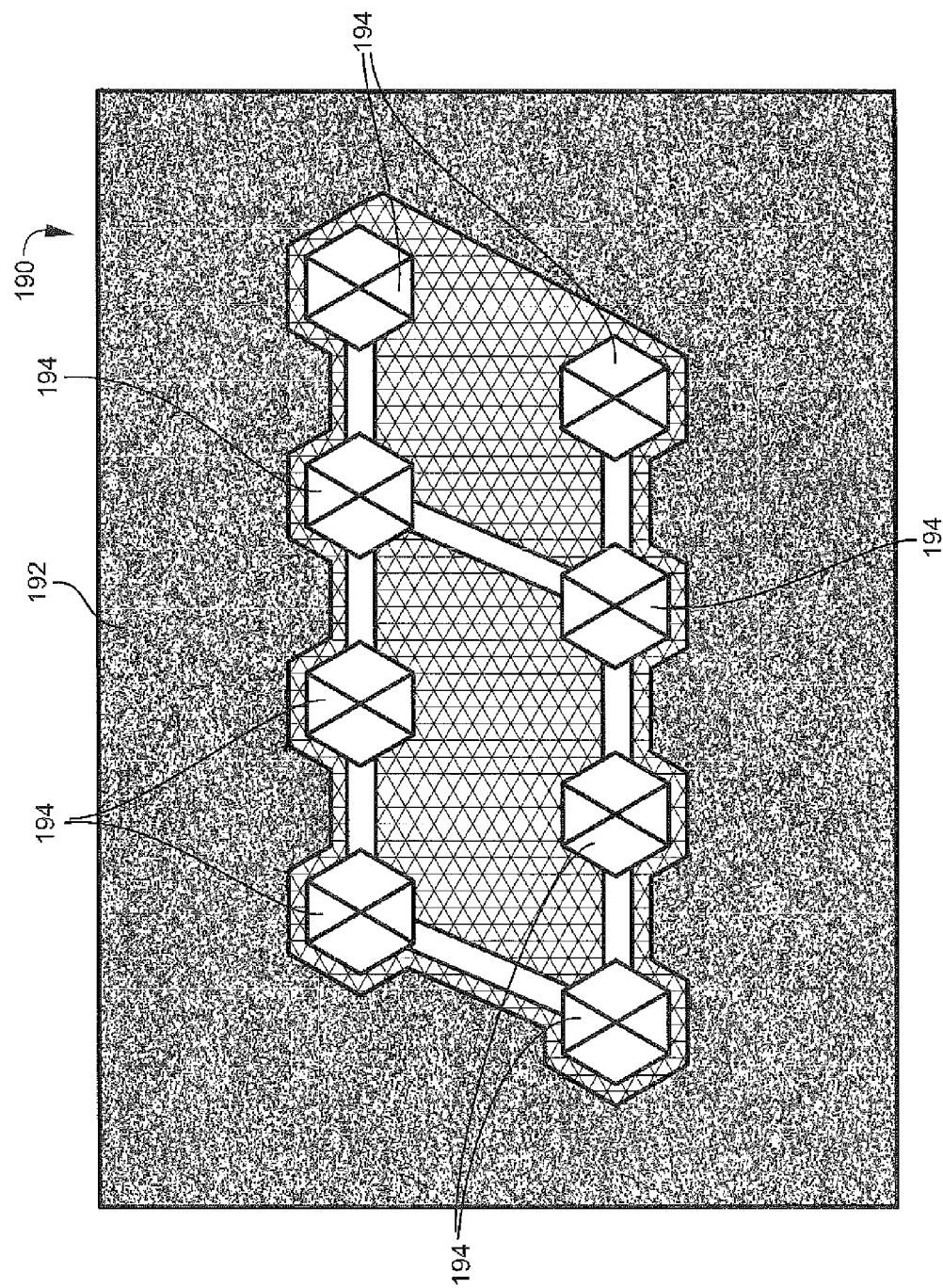
FIG. 26 shows a plan view of a static structure in the form of a poured-in-place or precast concrete dome.

FIG. 26 shows a structure 190 constructed of compacted CCR 192 according to one of the construction methods disclosed in this application and, in which, sheet piling, pouredin-place or precast vertical wall members form the interior volume 194 which poured-in-place or precast concrete domes are placed above. The size, shape, height and number of levels will vary depending on the end users' design requirements. The area between the vertical wall members 192 are initially voids that will be filled with either compacted and fortified and/or absorption CCR 192. This fortified CCR between the wall members 194 can be load bearing for the entire height of the structure 190 in a manner similar to columns on a high-rise building. At certain vertical distances, arches or other intermediate supports, not shown, can be inserted to help transmit the dead load of the structure 190 to these fortified CCR areas. Fortified walls can also be included in areas adjacent to TBM-created areas to help carry loads from above and other external forces to the foundation and ground. Sheet piling walls and metal roof construction can produce electromagnetic shielding for EMP sensitive items as detailed elsewhere in this application.

Figure 27:
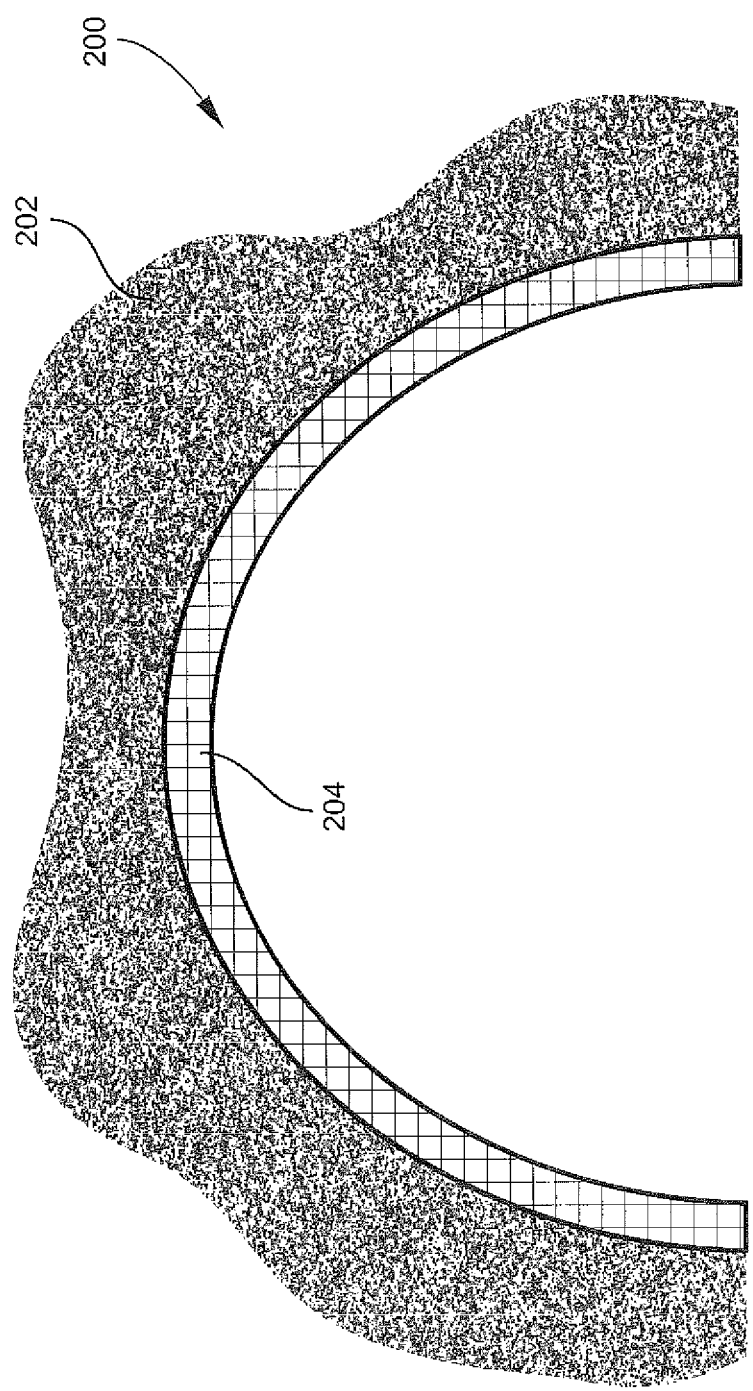
FIG. 27 shows a cross-section of a fabricated arch that will be manufactured with custom-made reusable metal forms.

Referring now to FIG. 27 a cross-section of a fabricated arch to support CCR 200 is illustrated. Custom-made reusable metal forms will be used to fabricate the concrete arch 204 or offsite precast concrete domes may be used as an alternative method. The arch 204 is designed to be high in compressive strength to carry the dead load of the above CCR 202 and any impact loads applied from weapon blasts to the fortified CCR behind the vertical wall members which are used to construct the interior space. Other load bearing methods and design spanning openings are detailed below. An on-site concrete batch plant can be installed to insure quality control in the concrete material produced for the manufacture of concrete arches.

In some applications, it may be required to construct a dome, not shown, fabricated of segmented arches to achieve the desired design outcome. This can be accomplished by constructing the dome in one or several pieces and assembled together with the use of a headstone at the intersection point.

Figure 28:
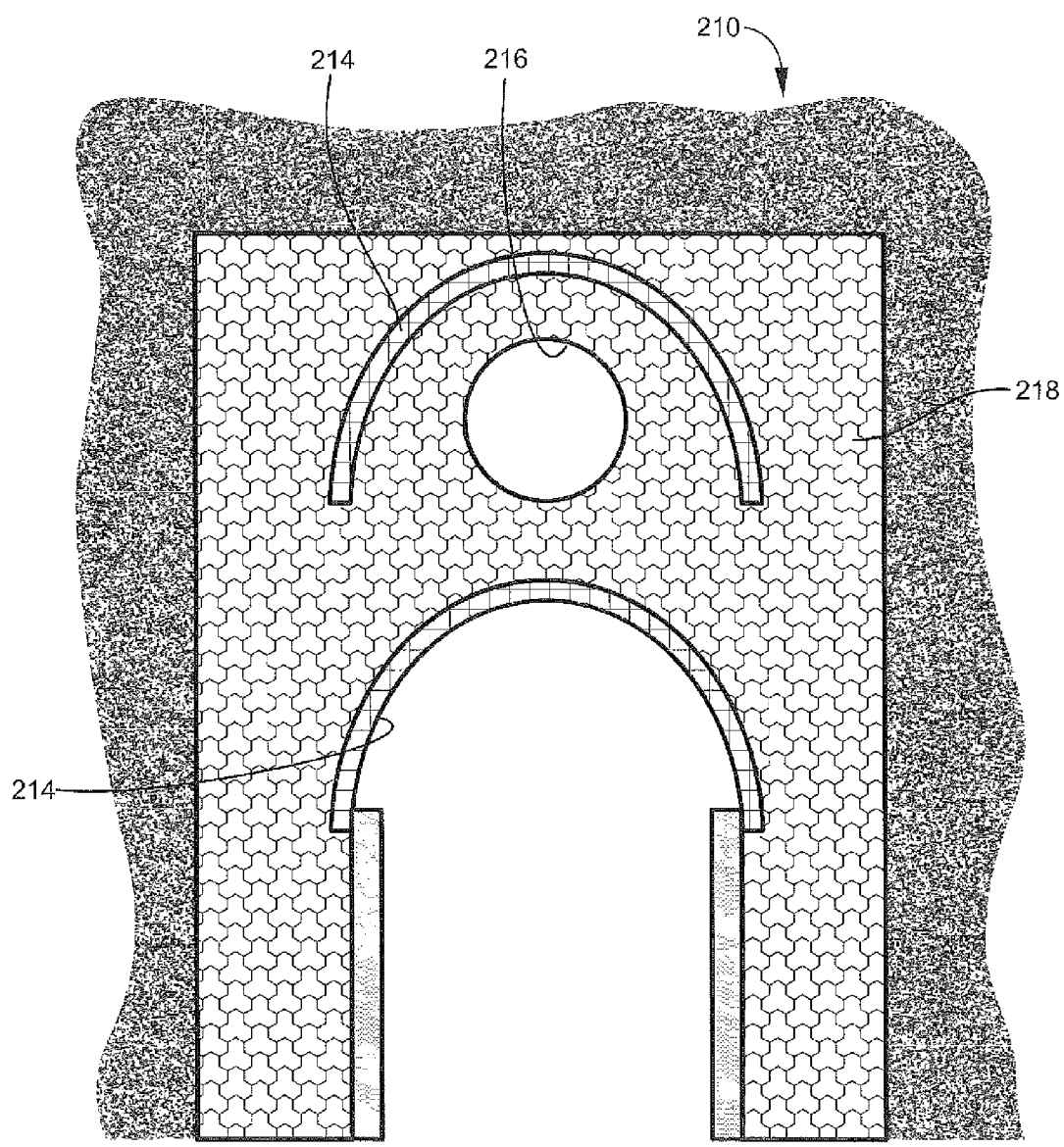
FIG. 28 shows a cross-section of sheet piling and a concrete arch that in this section is used in conjunction with tunnels or air tubes.

FIG. 28 shows a cross-section of a concrete arch 214 constructed of precast concrete or on-site manufactured concrete construction which are supported by fortified CCR 218 and is designed to carry the above CCR 212 in the hardened structure 210 that is used in conjunction with, for example, tunnels 216 and/or air tubes. Poured in place concrete walls, precast or other commonly used construction materials could be used in lieu of sheet piling. The CCR formulated mix design that is used next to metal for EMP electromagnetic shielding or construction materials, which could be damaged by non-pH neutral CCR will be formulated pH neutral and applied to the static structure in a way that will insure all CCR that is in contact with metal will be pH neutral. One advantage of using sheet piling for the interior spaces is that is can be used as part of the protection against EMP forces as described in detail below.

One of the most important applications of the use of this beneficial use is the protection of electronics, equipment and weapons from an electromagnetic pulse (EMP) from either naturally occurring geomagnetic storms, EMP effects from conventional nuclear weapons and specifically designed EMP nuclear weapons and recent advancement of non-nuclear radio frequency weapons that can target specific infrastructure with great accuracy and intense EMP forces (http://www.inquisitr.com/2122223/air-force-emp-weapon-confirmed-by-u-s-military-and-boeing)

"Natural EMP" from geomagnetic storms is a long-wavelength phenomenon that cannot couple directly into objects as small as a vehicle or most aircraft. Nuclear EMP with its electromagnetic shockwave, the short-wavelength E-1, can damage vehicles, aircraft and much smaller objects. The large mass and depth of the CCR in the static structure should offer some protection from naturally occurring geomagnetic storms, but with the use of CCR in combination with other materials, it is our intent through the formulations and applications of the beneficial uses described within this invention to offer the best possible EMP protection against the strongest and most advanced EMP events. See the below-listed links:
https://en.wikipedia.org/wiki/Faraday_cage;
http://www.bing.com/videos/search?q=tesla+coil+faraday+cage&qpvt=tesla+coil+faraday+cage&view=detail&mid-612E51C80DCE92595961612E51C80DCE92595961&FORM=VRDGAR;
and Electromagnetic Shielding is https://en.wikipedia.org/wiki/Electromagnetic_shielding

Chemical Characteristics of CCR

Depending on the sulphur content of the feed coal, the pH of fresh Fly Ash and Bottom Ash generally ranges between 4.5 and 12 (Dellantonio and others, 2010) https://www.usea.org/sites/default/files/012014_Management%20of%20coal%20combustion%20wastes_ccc231.pdf Electromagnetic shielding is constructed in most applications by producing a faraday cage using metals that are high in electrical conductivity. The CCR placed in contact with metal and/or other construction materials that could be negatively affected will have a formulated mix design that will be pH neutral. Lime maybe added to bring the acidity levels down or other readily acidic available elements could be added to bring the alkaline levels down. With a structure potentially having CCR from many different locations, a specific ash from a particular plant will have to be isolated to develop the CCR mix design to determine what is required in the formulated mix design to make the CCR for these applications pH neutral.

Figure 29:
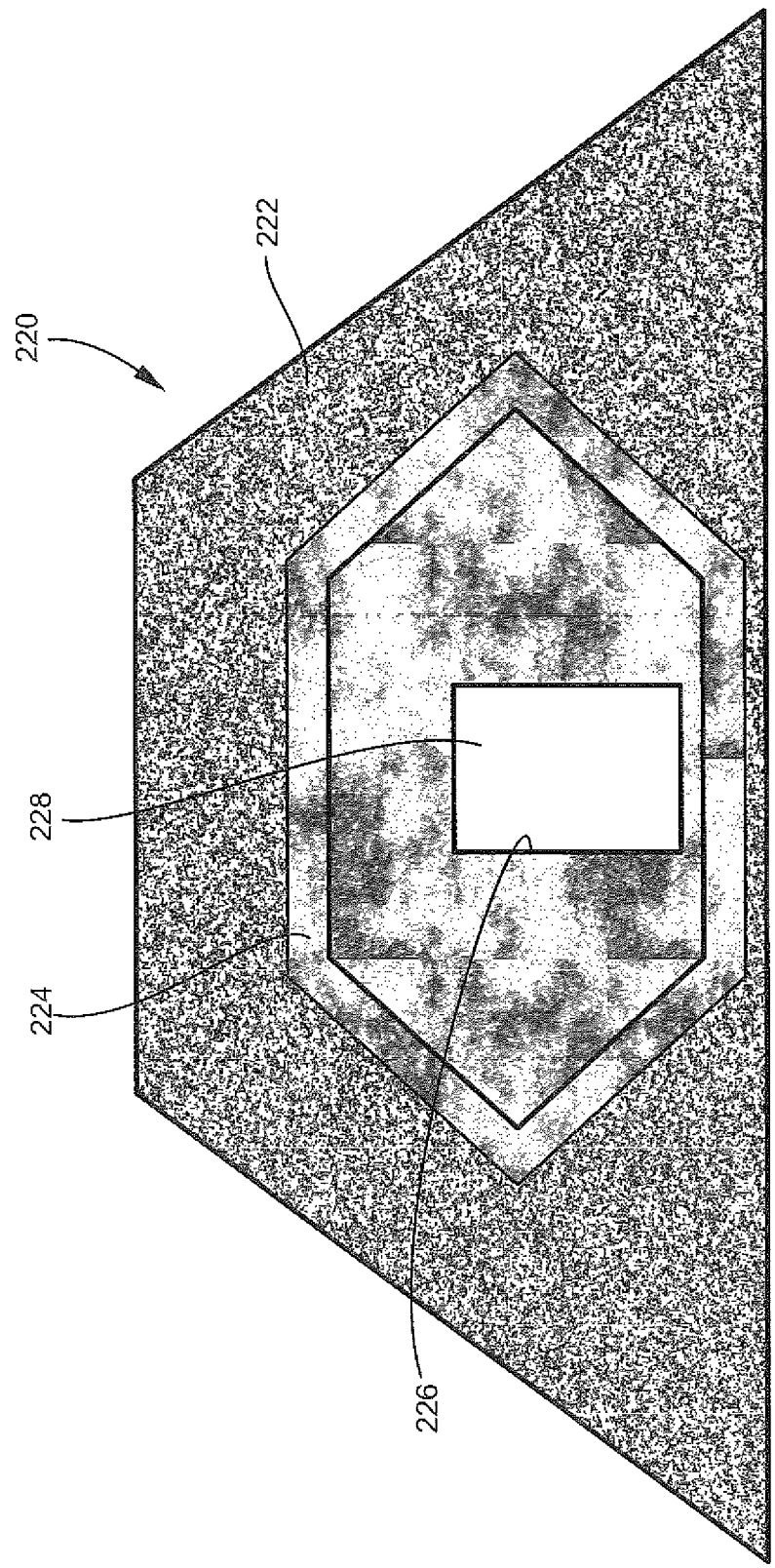
FIG. 29 shows a cross-section of a CCR static structure in which successive layers of electromagnetic shielding are installed.

Referring to FIG. 29, a structure 220 fabricated from CCR 222 according to techniques disclosed in this application is shown, in which successive layers of electromagnetic shielding 224 are installed along with the metal sheet piling 226 near critical equipment contained in the interior volume 228 of the structure 220 to act as the final barrier between damaging EMP and the electronic equipment. The electromagnetic shielding 224 sides has an approximate 30-degree side angle walls, but other angles including 90-degree vertical walls will also apply for this application. The application could also be used around the entire perimeter and the top and bottom of a structure for complete EMP protection. In addition, this application can be used to protect below ground or above ground electrical lines leading to or from the structure 220.

Figure 30:
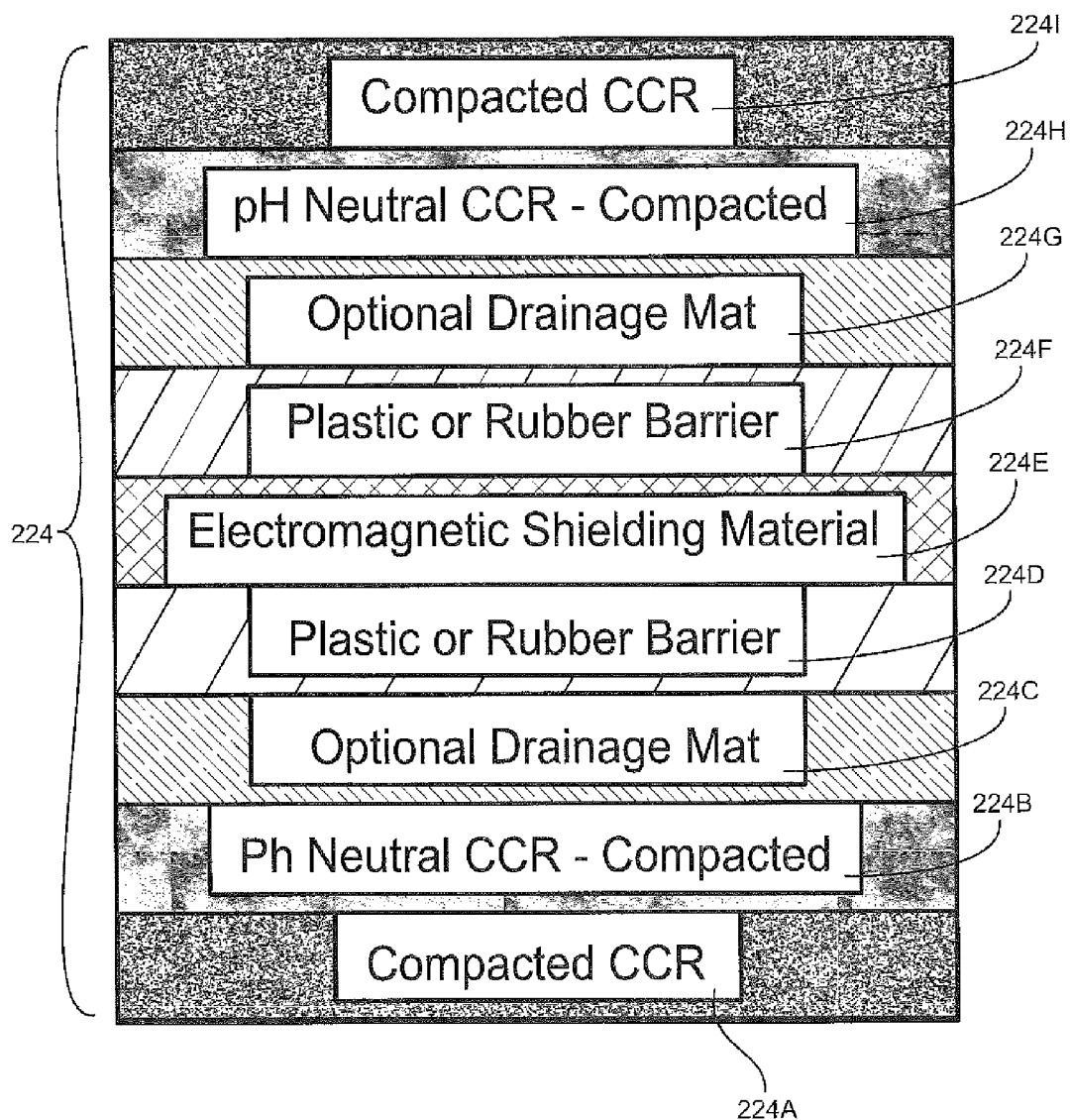
FIG. 30 shows an expanded detail of the electromagnetic shielding as depicted in FIG. 29.

FIG. 30 shows, in schematic form, an expanded detail of the electromagnetic shielding 224 as shown in FIG. 29. The detail from bottom to top includes compacted CCR 224A; compacted pH neutral CCR 224B; an optional geocomposite drainage mat 224C; plastic or rubber barrier 224D; electromagnetic shielding material which could be flat metal panels, metal mesh screens or other types of conductive materials 224E; a plastic or rubber barrier 224F; an optional geocomposite drainage mat 224G; compacted pH neutral CCR 224H; and compacted CCR 224I.

After placing the geocomposite drainage mat 224G, the pH neutral CCR 224H and the compacted CCR 224I will be placed using known construction means and methods whereas not to damage the electromagnetic shielding material.

Formulation and Application No. 12—EMP Protection Manufactured Product

Figure 31:
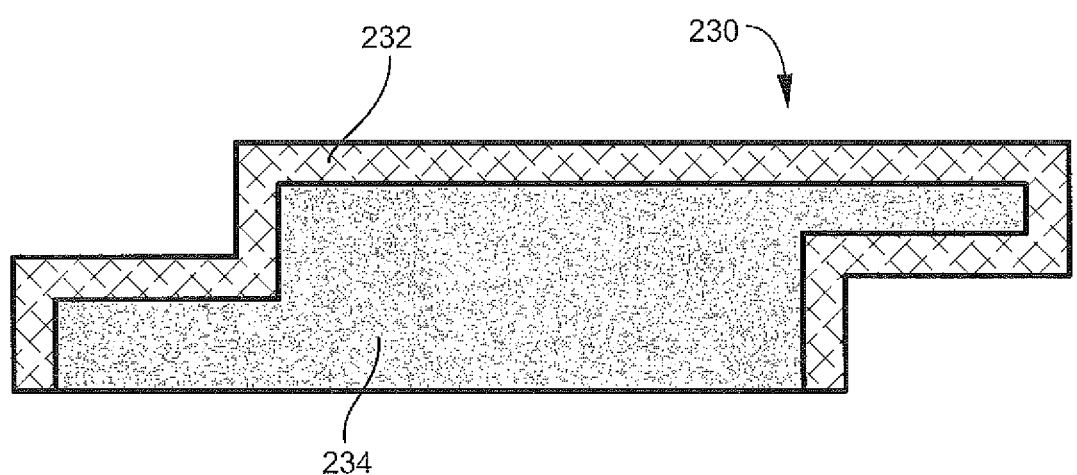
FIG. 31 shows a cross-section of a composite CCR/polymer/metal panel.

Referring now to FIG. 31, a cross-section of a composite CCR/polymer/metal panel 230 that includes conductive metal 232 overlaid as a shield onto a core of CCR with polymers 234 to be use as a component in the construction of an electromagnetic shield as part of a larger structure.

Figure 32:
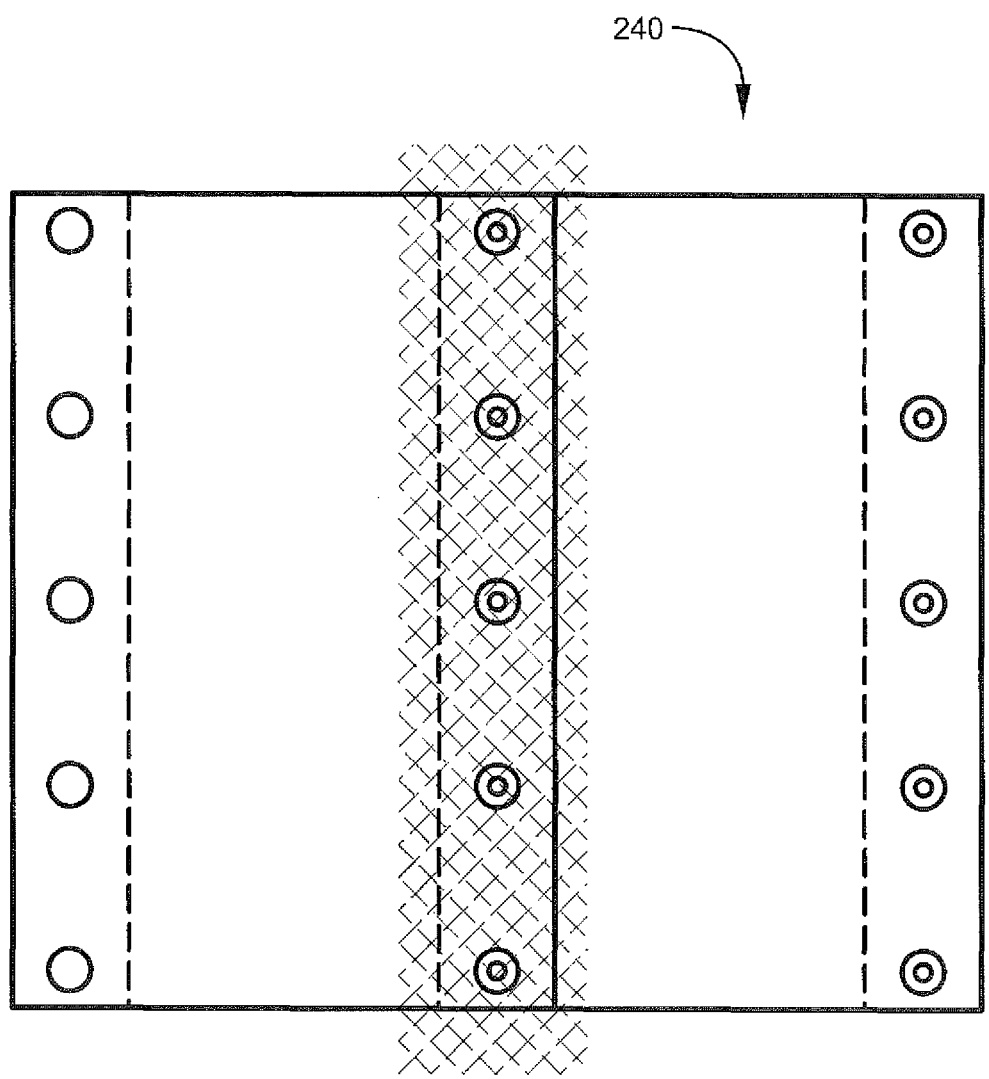
FIG. 32 shows a plan view of composite CCR/polymer/metal panels.

FIG. 32 is a plan view of a composite CCR/polymer/metal panel 240. These panels 240 will have a metal conductive surface on one of the large flat surfaces (top or bottom) and on the entire side perimeter. The CCR/polymer/metal panels will have the option to come with or without metal on both sides of the panel, depending on the end user requirements. Grommets on the lap sections will be used to lock the panels together and attach the panels to the existing structure. The rivets that tie the panels together will take into account galvanic protection to make sure dissimilar metals do not cause corrosion. Optionally, the CCR/polymer panels may be wrapped in a small mesh in lieu of fabricated metal panels. The thickness and size of the panels can vary, as required to meet the design requirements. After the panels are installed, additional metal strips, (metal panels or metal mesh) can be placed over the metal on the panels for increased EMP shielding. Other joints besides shiplap joints may be used. http://www.boralamerica.com/TruExterior/truexterior-siding/shiplap/0005. http://www.boralamerica.com/TruExterior/About/boraltruexterior®-products-are-like-no-other.

Figure 33:
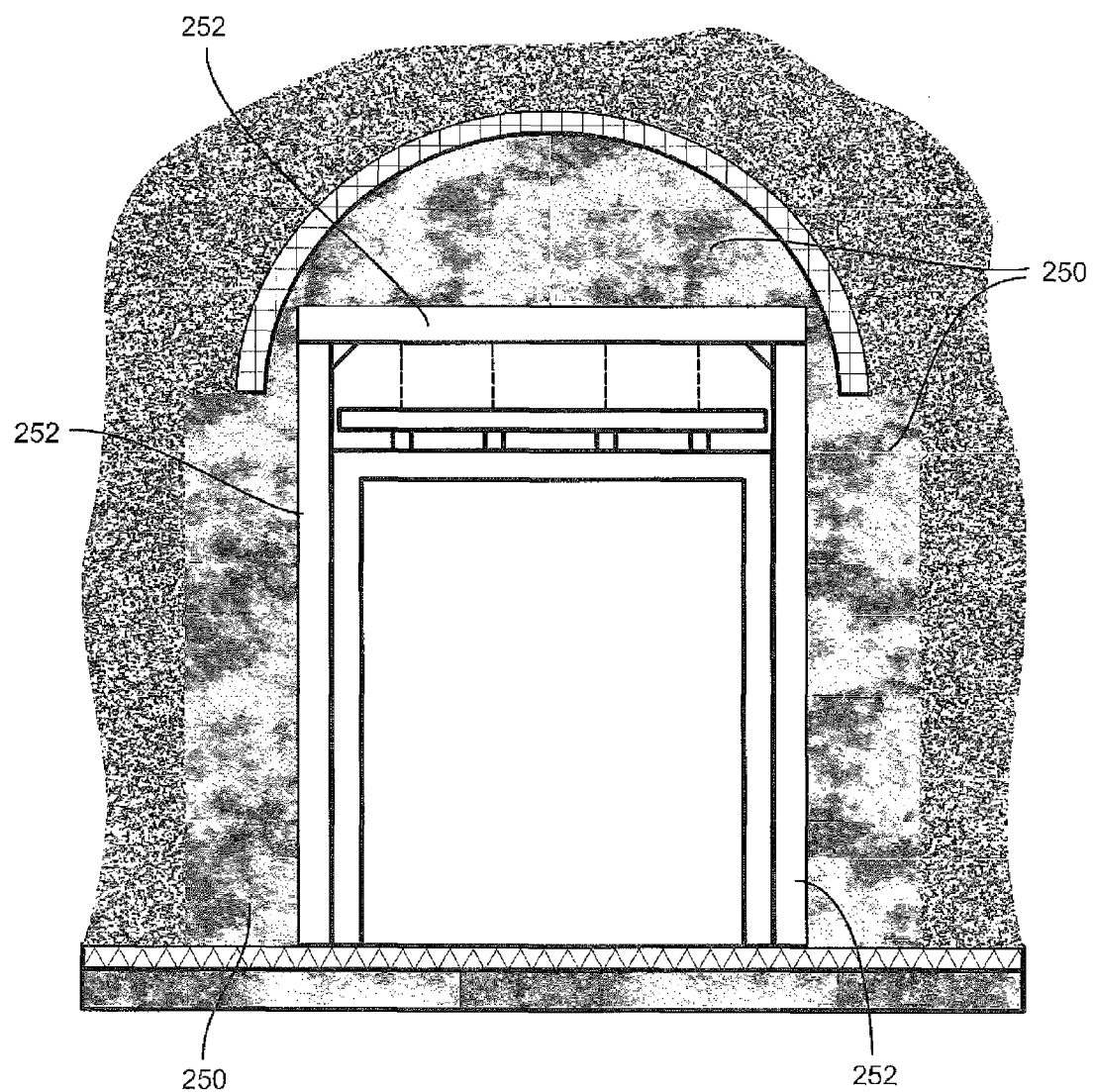
FIG. 33 shows a cross-section of an interior space with composite panels.
Figure 34:
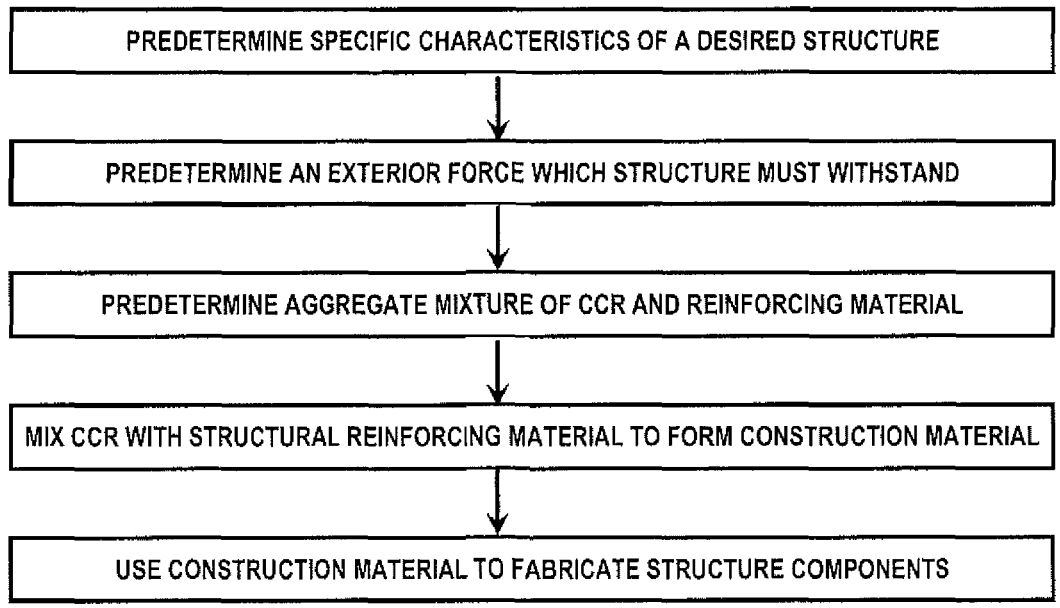
FIG. 34 is a flowchart of the method steps of an embodiment of the invention.

FIG. 33 shows a cross-section of pH neutral and fortified formulated CCR mix design 250 to be used next to sheet piling 252 which is used in unison with a precast concrete arch 204 to support CCR 256. Also shown on this section, is the CCR/polymer/metal panels 258 used underneath the arch on a suspended metal grid system to protect against EMP forces. The CCR/polymer/metal panels 260 are also used on a side wall. The floor will be EMP protected by either raised computer access flooring or electromagnetic shielding as described above in FIG. 30. With the use of sheet piling, metal sheet piling used in a horizontal position and the CCR/polymer/metal panels used in the entire enclosure, the EMP protection that is offered will be similar to an aircraft carrier's below deck spaces.

Formulation and Application No. 13—Rare Earth Mineral Storage Facility for Future Mining http://www.mining.com/us-coal-ash-highly-rich-in-rare-earths-scientists-find/ http://www.marketwired.com/press-release/royal-mines-and-minerals-corp-gold-technology-update-otcbb-rymm-2130132.htm. With China now producing over 90% of the rare earth elements ("REE") worldwide, it may become necessary in the future for the United States to have stockpiles of large quantities of CCR materials from which to mine rare elements. Also with the advancement in methods to mine these elements from CCR, one of the applications of the CCR is an unformulated and compacted CCR used in conjunction with formulations and applications described above for rare earth element storage. http://www.globalsecurity.org/military/world/china/rare-earth.htm.

The United States once was largely self-sufficient in these critical materials, but over the past decade has become dependent upon imports. In 1999 and 2000, more than 90% of REE required by the United States industry came from deposits in China. China currently produces more than 95% of the 120,000-130,000 metric tons of rare earth elements consumed annually worldwide. The rare-earth market is growing rapidly and is projected to accelerate if the green technologies are implemented on a broad scale.

Formulation and Application No. 14—Storage of CCR for Airplane Runway and Base Road Repair During the events of warfare, it is and has been one of the practices to bomb runways for military aircraft. An application of the storage of both compacted CCR, Gypsum FDG and/or aggregates is outlined above. In the event of damages to aircraft runways and vehicular roads on military bases, the stored CCR aggregate product along with the stored FDG can be mixed and readily available for immediate aircraft runway and vehicular road repair materials. Parts of the static structure for military installations can be to have this readily available material for repairs be a design component of the overall structure.

CONCLUSION

Methods of utilizing coal combustion residuals and structures constructed from such coal combustion residuals according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A method of fabricating a blast and electromagnetic-resistant structure that includes the steps of:
   a. predetermining specific characteristics of a desired blast and electromagnetic-resistant structure dictated by a specified requirement of the structure;
   b. predetermining an exterior blast which exterior walls of the structure must withstand;
   c. predetermining an aggregate mixture of coal combustion residuals ("CCR") and structural reinforcing material suitable for use in constructing the structure according to specific characteristics;
   d. mixing CCR with a predetermined structural reinforcing material to form the predetermined structural reinforcing construction material;
   e. providing electromagnetic shielding to the exterior walls of the structure, comprising a multi-layer composite that includes a first layer of compacted CCR, a first compacted layer of pH neutral CCR, a first layer of a plastic or rubber barrier, a layer of electromagnetic shielding material; a second layer of a plastic or rubber barrier; a second layer of compacted pH neutral CCR, and a second layer of compacted CCR; and
   f. utilizing the reinforcing construction material to fabricate components of the structure in a manner sufficient to provide protection against the predetermined exterior blast.

2. A method according to claim 1, wherein the electromagnetic shielding includes a first drainage mat positioned between the first layer of compacted pH neutral CCR and the first layer of plastic or rubber, and a second drainage mat positioned between the second layer of plastic or rubber and the second layer compacted pH neutral CCR.

3. A method according to claim 2, and including the step of constructing structural exterior enclosure-forming components of reinforcing material fabricated from an aggregate mixture of CCR and structural reinforcing material suitable for use in constructing the structure according to specific desired characteristics based predetermining specific characteristics of a desired structure dictated by a specified requirement of the structure based on a predetermined exterior force which the structure must withstand.

4. A method according to claim 3, and including the step of constructing the structure according to a group of construction techniques consisting of poured-in-place concrete, precast concrete, sheet piling, roller compacted concrete and arched ceilings.

5. A method according to claim 1, wherein the structure is a high angle rifle training facility.

6. A method according to claim 1, wherein the structural reinforcing material is selected from the group consisting of lime, cement, circulating fluidized bed ash, commercially available admixtures, Class C ash, Class F ash, synthetic gypsum, limestone, dolomite and pozzalan.

* * * * *